(12) United States Patent
Tachibana

(10) Patent No.: US 10,334,127 B2
(45) Date of Patent: Jun. 25, 2019

(54) IMAGE PROCESSING APPARATUS, CONTROL METHOD AND STORAGE MEDIUM FOR ENABLING A USER TO CHECK A MAINTENANCE METHOD CORRESPONDING TO A MAINTENANCE EVENT THROUGH A MOVING IMAGE

(71) Applicant: CANON KABUSHIKI KAISHA, Tokyo (JP)

(72) Inventor: Yoshiro Tachibana, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 15/710,599

(22) Filed: Sep. 20, 2017

(65) Prior Publication Data

US 2018/0091666 A1 Mar. 29, 2018

(30) Foreign Application Priority Data

Sep. 27, 2016 (JP) .................. 2016-188414

(51) Int. Cl.
*G03G 15/00* (2006.01)
*H04N 1/00* (2006.01)

(52) U.S. Cl.
CPC ....... *H04N 1/00435* (2013.01); *G03G 15/502* (2013.01); *G03G 15/5016* (2013.01); *H04N 1/00413* (2013.01); *H04N 1/00925* (2013.01); *G03G 15/5079* (2013.01); *G03G 15/55* (2013.01); *H04N 1/00411* (2013.01); *H04N 2201/0093* (2013.01)

(58) Field of Classification Search
CPC .......... H04N 1/00435; H04N 1/00411; H04N 1/00925; H04N 1/00413; H04N 2201/0093; G03G 15/502; G03G 15/5016; G03G 15/55; G03G 15/5079
USPC .......................... 399/9, 11, 38, 42, 75, 79–81
See application file for complete search history.

(56) References Cited

U.S. PATENT DOCUMENTS

| 7,801,452 | B2 * | 9/2010 | Okamoto ............... G03G 15/70 399/11 |
| 8,391,740 | B2 * | 3/2013 | Ogasawara ........ G03G 15/5016 361/679.07 |
| 2004/0057743 | A1 * | 3/2004 | McIntyre ........... G03G 15/5016 399/81 |
| 2007/0212097 | A1 * | 9/2007 | Hoshino ............ G03G 15/5016 399/81 |
| 2015/0109637 | A1 * | 4/2015 | Ikeda ................... H04N 1/0049 358/1.15 |
| 2015/0168906 | A1 * | 6/2015 | Ishii ....................... G03G 15/70 399/21 |

FOREIGN PATENT DOCUMENTS

JP 2015-82706 A 4/2015

* cited by examiner

*Primary Examiner* — Hoan H Tran
(74) *Attorney, Agent, or Firm* — Canon U.S.A., Inc. IP Division

(57) ABSTRACT

An image processing apparatus displays, based on detection of a maintenance event, a first maintenance screen including a moving image illustrating a maintenance method corresponding to the maintenance event, and displays a second maintenance screen including the moving image illustrating the maintenance method based on receipt of a display instruction to display the maintenance method in a state where the maintenance event is not detected.

13 Claims, 26 Drawing Sheets

FIG.4A

| MAINTENANCE ID | MOVING IMAGE LIST |
|---|---|
| 001 | A1, A2, A3 |
| 002 | B1, B2, B3, B10 |
| 003 | B1, B4, B5, B10 |
| 004 | B1, B6, B7, B10 |
| 005 | B1, B8, B9, B10 |
| 006 | B1, B2, B3, B4, B5, B10 |
| 007 | B1, B2, B3, B6, B7, B10 |
| 008 | B1, B2, B3, B8, B9, B10 |
| 009 | B1, B4, B5, B6, B7, B10 |
| 010 | B1, B4, B5, B8, B9, B10 |
| 011 | B1, B6, B7, B8, B9, B10 |
| 012 | B1, B2, B3, B4, B5, B6, B7, B10 |
| 013 | B1, B2, B3, B4, B5, B8, B9, B10 |
| 014 | B1, B2, B3, B6, B7, B8, B9, B10 |
| 015 | B1, B4, B5, B6, B7, B8, B9, B10 |
| 016 | B1, B2, B3, B4, B5, B6, B7, B8, B9, B10 |
| 017 | C1, C2, C4 |
| 018 | C1, C3, C4 |
| 019 | C1, C2, C3, C4 |
| ... | |

FIG. 4B

| MOVING IMAGE ID | MOVING IMAGE FILE | REPRODUCTION TIME | COVER OPENING/ CLOSING FLAG | MESSAGE |
|---|---|---|---|---|
| A1 | /movie/A1.mpeg | 0:13 | 0 | PLEASE PREPARE NEW TONER COLLECTION CONTAINER AND OPEN FRONT COVER. |
| A2 | /movie/A2.mpeg | 0:14 | 1 | PLEASE HOLD HANDLE AND TAKE OUT TONER COLLECTION CONTAINER. |
| A3 | /movie/A3.mpeg | 0:27 | 1 | PLEASE SET NEW TONER COLLECTION CONTAINER AND CLOSE FRONT COVER. |
| B1 | /movie/B1.mpeg | 0:13 | 0 | PLEASE PREPARE NEW TONER CONTAINER AND OPEN FRONT COVER. |
| B2 | /movie/B2.mpeg | 0:10 | 1 | PLEASE TAKE OUT BLACK TONER CONTAINER. |
| B3 | /movie/B3.mpeg | 0:30 | 1 | PLEASE SET NEW BLACK TONER CONTAINER ALL THE WAY INSIDE. |
| B4 | /movie/B4.mpeg | 0:10 | 1 | PLEASE TAKE OUT YELLOW TONER CONTAINER. |
| B5 | /movie/B5.mpeg | 0:30 | 1 | PLEASE SET NEW YELLOW TONER CONTAINER ALL THE WAY INSIDE. |
| B6 | /movie/B6.mpeg | 0:10 | 1 | PLEASE TAKE OUT MAGENTA TONER CONTAINER. |
| B7 | /movie/B7.mpeg | 0:30 | 1 | PLEASE SET NEW MAGENTA TONER CONTAINER ALL THE WAY INSIDE. |
| B8 | /movie/B8.mpeg | 0:10 | 1 | PLEASE TAKE OUT CYAN TONER CONTAINER. |
| B9 | /movie/B9.mpeg | 0:30 | 1 | PLEASE SET NEW CYAN TONER CONTAINER ALL THE WAY INSIDE. |
| B10 | /movie/B10.mpeg | 0:17 | 1 | PLEASE CLOSE FRONT COVER. |
| C1 | /movie/C1.mpeg | 0:20 | 0 | PLEASE OPEN RIGHT COVER. |
| C2 | /movie/C2.mpeg | 0:15 | 1 | PLEASE REMOVE JAMMED PAPER AT ILLUSTRATED POSITION. |
| C3 | /movie/C3.mpeg | 0:15 | 1 | PLEASE REMOVE JAMMED PAPER AT TWO-SIDED CONVEYANCE UNIT. |
| C4 | /movie/C4.mpeg | 0:10 | 1 | PLEASE CLOSE RIGHT COVER. |
| | | | | ... |

*411*  *412*  *413*  *414*  *415*

*410*

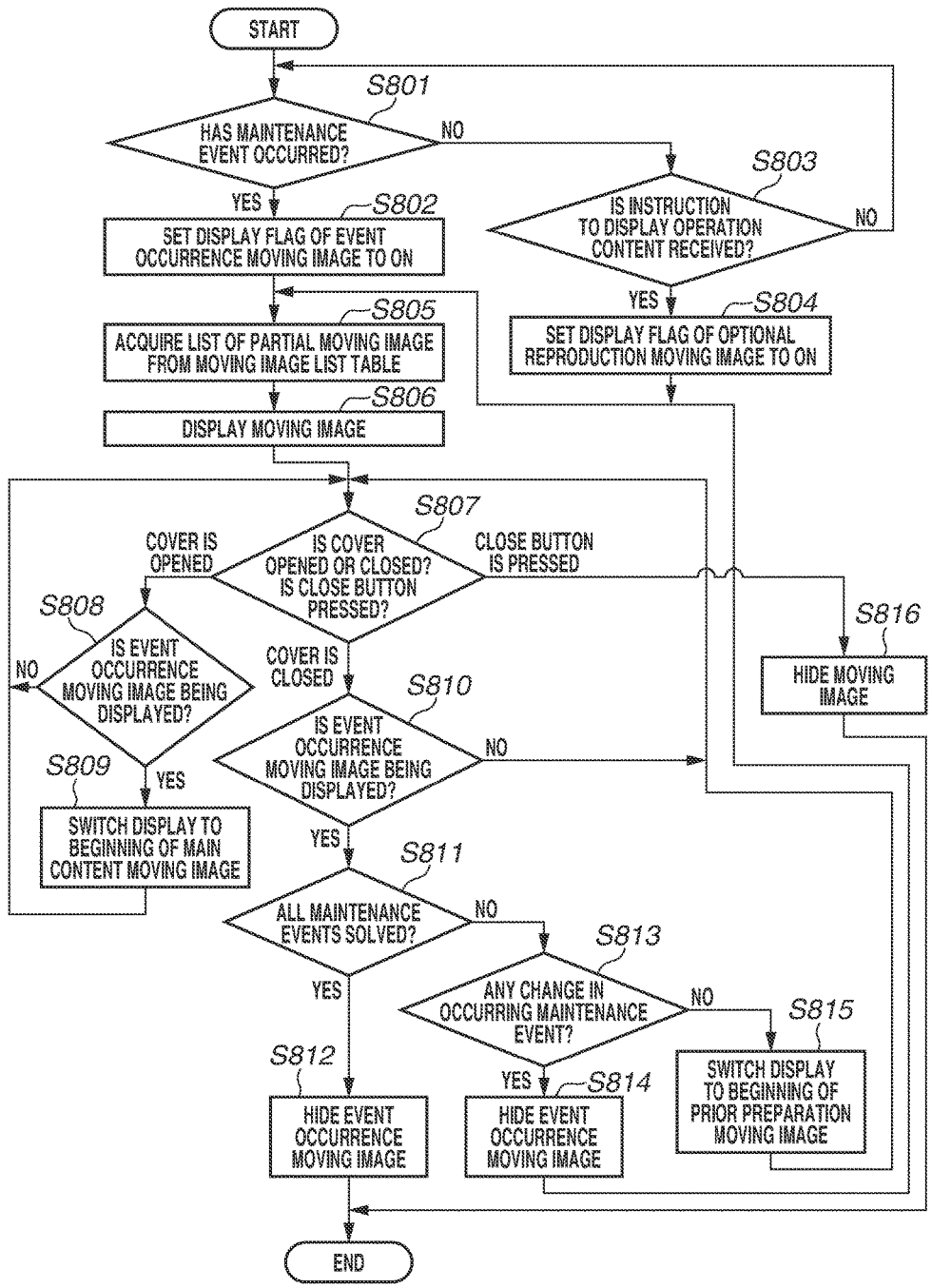

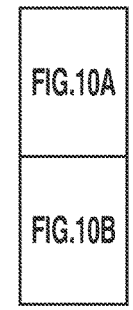
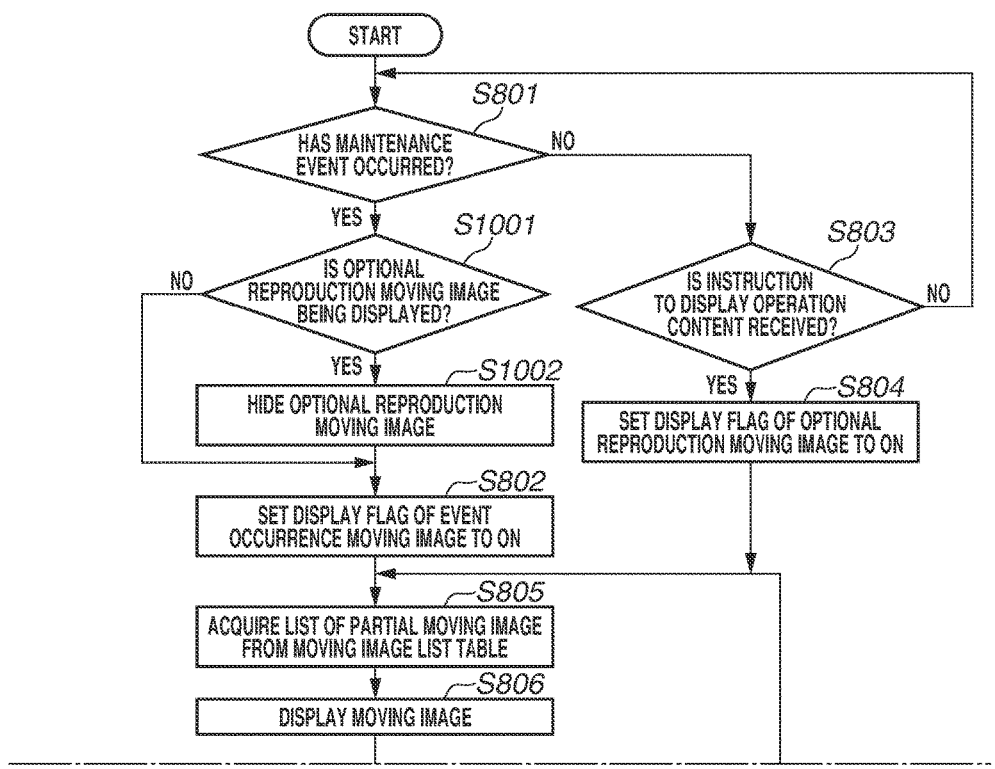
FIG.10A

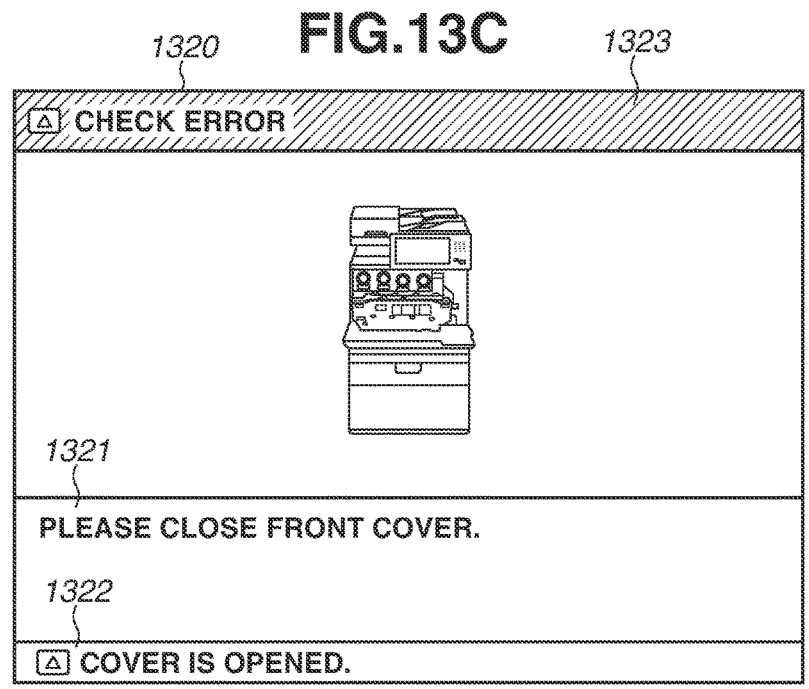
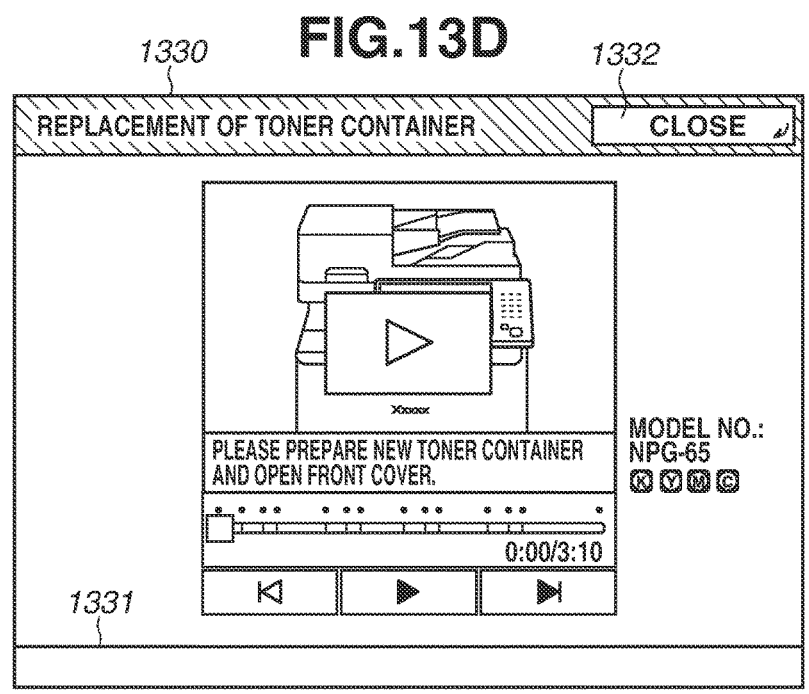

IMAGE PROCESSING APPARATUS, CONTROL METHOD AND STORAGE MEDIUM FOR ENABLING A USER TO CHECK A MAINTENANCE METHOD CORRESPONDING TO A MAINTENANCE EVENT THROUGH A MOVING IMAGE

BACKGROUND

Field

The present disclosure relates to an image processing apparatus that displays a moving image illustrating a maintenance method, a control method of the image processing apparatus, and a storage medium.

Description of the Related Art

Conventionally, there has been provided an image forming apparatus that provides an operation content of maintenance work, i.e., clearing a paper jam, replacing a toner container, or replenishing staples, through a moving image (Japanese Patent Application Laid-Open No. 2015-82706). This is intended to enable a user to perform maintenance work more smoothly by utilizing a moving image that is highly expressive and excellent in providing a lot of information.

In the above-described image forming apparatus, moving images are provided for respective operation contents (operation elements), and when a maintenance event occurs, a series of operation contents required to solve the maintenance event is provided to the user through a combined plurality of moving images illustrating the respective operation contents. For example, when occurrence of a paper jam is detected at a conveyance portion, a plurality of moving images illustrating operations of opening a cover provided on a housing, removing a jammed paper at the conveyance portion after opening the cover, and closing the cover after removing the jammed paper are reproduced in that order.

However, in the conventional image forming apparatus, the user can check the series of operation contents required to solve a maintenance event through a moving image only when the maintenance event, such as a paper jam or a lack of toner, has occurred. In other words, even if the user wishes to check the series of operation contents through a moving image with an aim to learn the operation contents, the user is unable to previously check the operation contents unless the maintenance event occurs at that time. Accordingly, for example, in a case where an installation contractor explains the operation contents of clearing a paper jam while showing the moving image to a client, the installation contractor has to intentionally generate a paper jam by opening a cover of the image forming apparatus during printing, which is problematic in that toner or a sheet is consumed wastefully. In a case where the operation content of replenishing consumables, such as toner or staples, is to be explained, a considerable amount of time and labor is required because the toner or the staples have to be completely consumed.

SUMMARY

The present disclosure is directed to an image processing apparatus that enables a user to optionally check a maintenance method corresponding to a maintenance event through a moving image even in a state where the maintenance event does not occur.

According to an aspect of the present disclosure, an image processing apparatus includes a detection unit configured to detect a maintenance event, a reception unit configured to receive a display instruction to display a maintenance method corresponding to the maintenance event, and a display control unit configured to display a first maintenance screen including a moving image illustrating the maintenance method based on the detection of the maintenance event and display a second maintenance screen including the moving image illustrating the maintenance method based on the receipt of the display instruction in a state where the maintenance event is not detected.

Further features will become apparent from the following description of exemplary embodiments with reference to the attached drawings.

BRIEF DESCRIPTION OF THE DRAWINGS

FIGS. 4A and 4B are data configuration tables in which a relationship between a maintenance event and a moving image in the exemplary embodiment is defined.

FIG. 8 is a flowchart illustrating display processing of a moving image illustrating a maintenance method according to the first exemplary embodiment.

FIGS. 13A, 13B, 13C, and 13D are diagrams illustrating examples of screens displayed on the display device 115 according to a fourth exemplary embodiment.

DESCRIPTION OF THE EMBODIMENTS

Hereinafter, an exemplary embodiment will be described with reference to the appended drawings.

Figure 1:
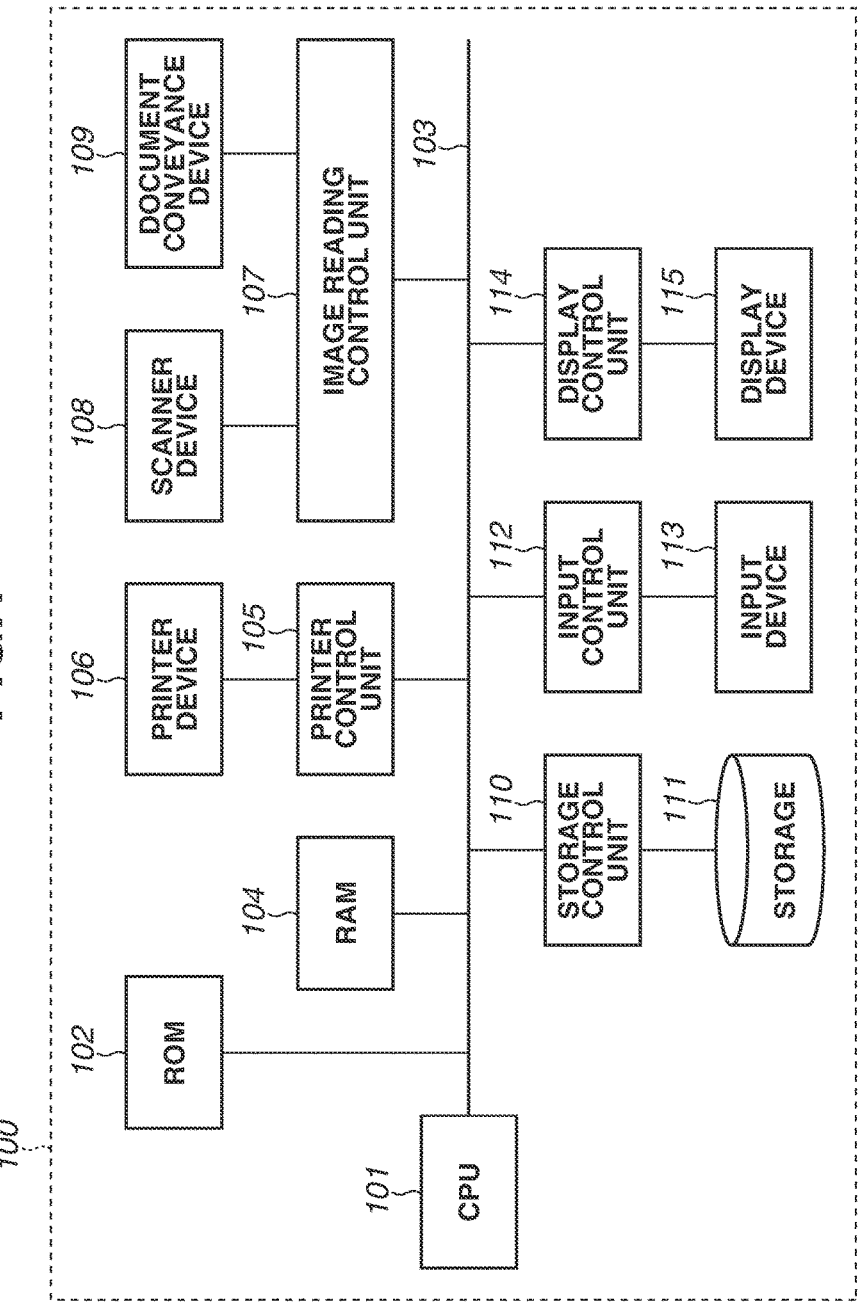
FIG. 1 is a block diagram schematically illustrating a configuration of an image forming apparatus according to an exemplary embodiment.

FIG. 1 is a block diagram schematically illustrating a configuration of an image forming apparatus 100 according to the present exemplary embodiment.

In FIG. 1, the image forming apparatus 100 includes a central processing unit (CPU) 101, a read only memory (ROM) 102, a random access memory (RAM) 104, a printer control unit 105, an image reading control unit 107, a storage control unit 110, an input control unit 112, and a display control unit 114, which are connected to each other via a bus 103. The image forming apparatus 100 further includes a storage 111, a printer device 106, a scanner device 108, a document conveyance device 109, an input device 113, and a display device 115.

The CPU 101 controls the entirety of the image forming apparatus 100. The CPU 101 boots an operating system (OS) by a boot program stored in the ROM 102. Then, the CPU 101 executes a program stored in the storage 111 on the OS.

The RAM 104 is used as a temporary storage area such as a main memory or a work area of the CPU 101. When the CPU 101 executes the program, the program is read out from the storage 111 and stored in the RAM 104.

The printer control unit 105 controls the printer device 106 to print image data on a sheet such as paper. The printer device 106 prints image data on a sheet.

The image reading control unit 107 controls the scanner device 108 to read an image on a document to generate image data. Further, the image reading control unit 107 controls the document conveyance device 109 such as an auto-document feeder (ADF) to convey documents placed on a document positioning plate of the document conveyance device 109 to the scanner device 108 one by one, so as to generate image data. The scanner device 108 scans a document by using an optical reading device such as a charge coupled device (CCD) sensor and converts image information of the document into an electric signal data.

The storage 111 is a readable/writable non-volatile storage device such as a hard disk drive (HDD). Data of various types, i.e., a program for controlling the entirety of the image forming apparatus 100, various application programs, and a moving image illustrating a series of operation contents required to solve a maintenance event, are stored in the storage 111. Then, the respective programs are executed by the CPU 101. The storage control unit 110 controls the storage 111.

The input control unit 112 receives an operation instruction from a user through the input device 113 such as a touch panel or a hard key. The display control unit 114 controls the display device 115 such as a liquid crystal display (LCD) or a cathode-ray tube (CRT) display to display an operation screen or a moving image to the user.

Figure 2:
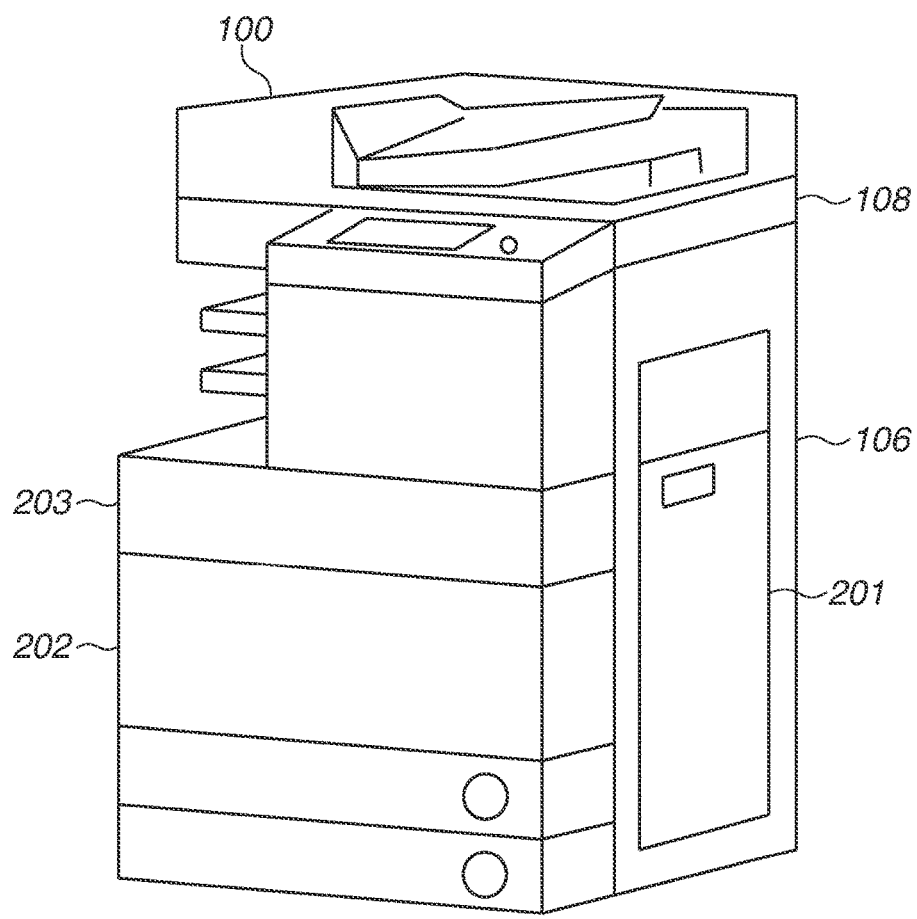
FIG. 2 is a diagram illustrating an external view of the image forming apparatus according to the exemplary embodiment.

FIG. 2 is a diagram illustrating an external view of the image forming apparatus 100.

In FIG. 2, the image forming apparatus 100 is provided with a right cover 201 and a front cover 202. The right cover 201 is provided to expose a sheet conveyance path to remove a jammed sheet. The front cover 202 is provided to exposure an attachment position of a toner container or a toner collection container when the toner container or the toner collection container is to be replaced. The image forming apparatus 100 includes a sensor for detecting an opening/closing state of the above-described right cover 201 or the front cover 202.

Figure 3:
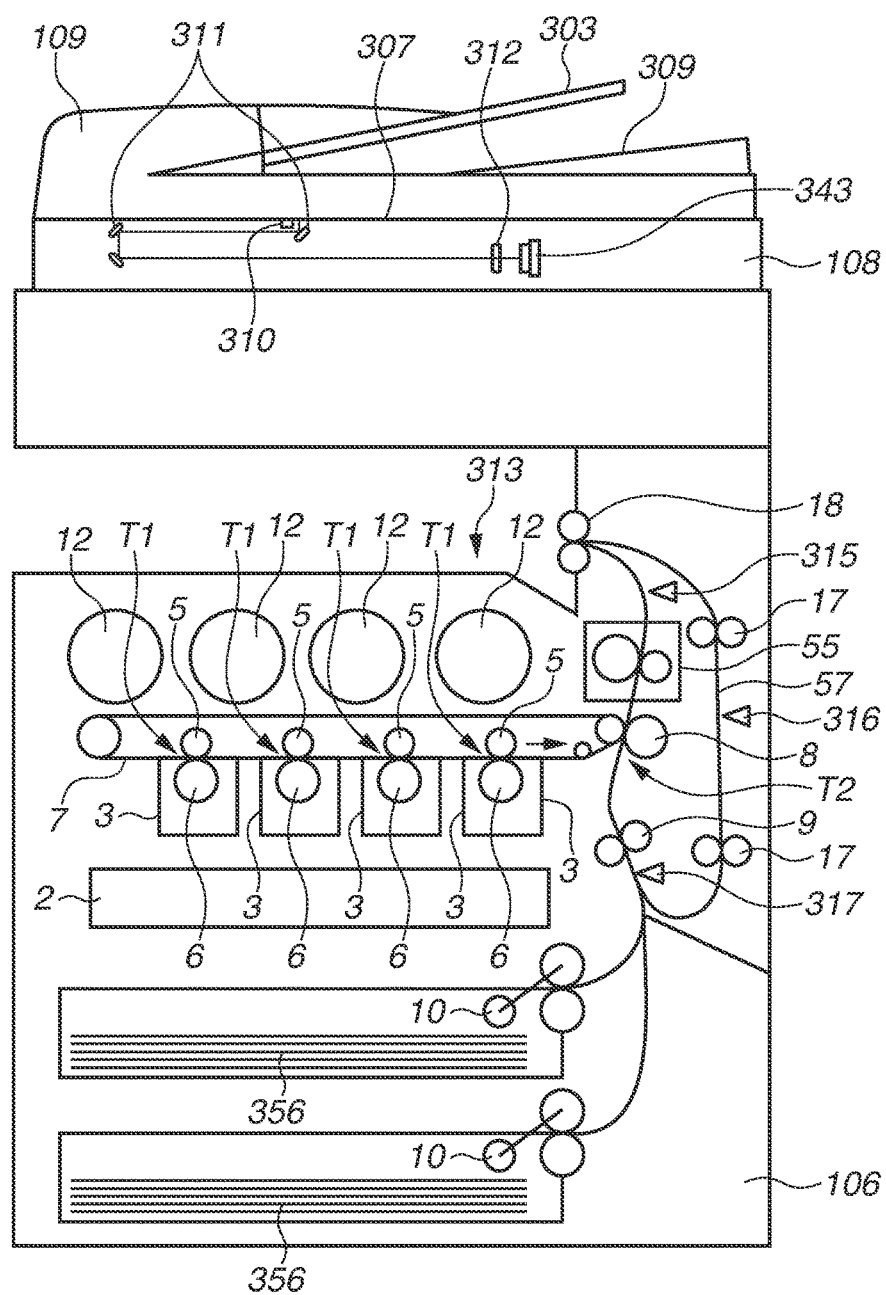
FIG. 3 is a cross-sectional diagram illustrating an internal structure of the image forming apparatus according to the exemplary embodiment.

FIG. 3 is a cross-sectional diagram illustrating an internal structure of the image forming apparatus 100.

The internal structure in FIG. 3 is one example of an image forming apparatus for forming an image in full colors of yellow, magenta, cyan, and black. Further, the image forming apparatus 100 is a so-called tandem type image forming apparatus in which four photosensitive drums as image bearing members that bear toner images of respective colors of yellow, magenta, cyan, and black are arranged in a rotation direction of an intermediate transfer belt 7 as an intermediate transfer member. The above-described image forming apparatus 100 includes the scanner device 108, the document conveyance device 109, and the printer device 106.

First, reading processing executed by the scanner device 108 will be described.

When the reading processing is executed by setting a document on a document positioning plate 307, the user sets a document on the document positioning plate 307 and closes the document conveyance device 109. When an opening/closing sensor detects closing of the document conveyance device 109, a reflection-type document size detection sensor provided inside a housing of the scanner device 108 detects a size of the document set on the document positioning plate 307. After the document size is detected, the document is irradiated with light emitted from a light source 310, and the irradiation light is incident on a CCD 343 via a reflection plate 311 and a lens 312. The CCD 343 converts the incident light into a digital signal and transmits the digital signal to a controller of the scanner device 108. The controller executes desired image processing on the transmitted digital signal to convert the transmitted digital signal into a laser recording signal, and stores the laser recording signal in a memory as image data.

When the reading processing is executed by setting a document on the document conveyance device 109, the user places a document on a tray of a document setting unit 303 of the document conveyance device 109 with a reading face thereof facing upward. When the document is placed, a document presence/absence detection sensor detects presence of the set document. When presence of the set document is detected by the document presence/absence detection sensor, the controller rotates a document feeding roller and a conveyance belt to convey the document to a predetermined reading position of the document positioning plate 307. After the document is conveyed to a predetermined reading position, the controller executes reading processing of the document and stores image data generated by the reading processing of the document in a memory. Then, after the reading processing is completed, the document is discharged to a document discharge tray 309 via a conveyance roller.

When a plurality of set documents exists in the document conveyance device 109, the controller discharges the read document and feeds a next document by using a feeding roller, and executes next reading processing simultaneously. As described above, the reading processing is executed on a plurality of documents.

Next, printing processing executed by the printer device 106 will be described.

The printer device 106 includes process cartridges 3 of respective colors, exposure units (not illustrated) for irradiating the photosensitive drums 6 with laser light, the intermediate transfer belt 7, primary transfer rollers 5 as primary transfer units, a secondary transfer roller 8 as a secondary transfer unit, and a fixing unit 55.

Each of the process cartridges 3 includes a photosensitive drum 6, a charging unit (not illustrated) arranged in the periphery of the photosensitive drum 6, a development unit, and a cleaner. The intermediate transfer belt 7 is stretched upon a plurality of tension rollers to be arranged adjacent to the process cartridges 3 and brought into contact with the photosensitive drums 6. The above-described intermediate transfer belt 7 is rotationally driven by one of the tension rollers (i.e., driving roller) connected to a motor (not illustrated) to be rotated in a direction indicated by an arrow in FIG. 3. The primary transfer rollers 5 are arranged at positions facing the photosensitive drums 6 with the intermediate transfer belt 7 therebetween. Further, on a downstream side of the process cartridges 3 in a rotation direction of the intermediate transfer belt 7, the secondary transfer roller 8 is arranged to be in contact with the intermediate transfer belt 7, so that a secondary transfer portion T2 is formed by the secondary transfer roller 8 and the intermediate transfer belt 7. The exposure unit (not illustrated) is arranged on each of the process cartridges 3, at a position on the opposite side of the intermediate transfer belt 7, and based on the information read by the scanner device 108 or the information transmitted externally from the image forming apparatus 100, the exposure unit irradiates the photosensitive drum 6 with laser light.

Further, in the present exemplary embodiment, the image forming apparatus 100 includes toner containers 12 for supplying toner of respective colors to the development units of the process cartridges 3. The fixing unit 55 is arranged on a downstream side of the secondary transfer portion T2, and applies heat and pressure to a recording material that carries a toner image to fix the toner image on the recording material. Further, the printer device 106 includes a plurality of cassettes 356 for storing sheets. The sheets are picked up from the cassettes 356, conveyed to the secondary transfer portion T2 and the fixing unit 55, and discharged to a discharge port 313 after fixing processing is executed thereon. Further, in order to execute two-sided printing, the printer device 106 also includes an inversion conveyance mechanism that inverts and conveys a sheet.

The image forming apparatus 100 configured as the above executes image forming processing as follows.

First, a surface of the photosensitive drum 6 of each color is charged by the charging unit and exposed to light by the exposure unit (not illustrated), so that a latent image is formed on the photosensitive drum 6. Each latent image is developed by the development unit, so that a toner image is formed on the photosensitive drum 6. The toner image formed on the photosensitive drum 6 reaches a primary transfer portion T1 where the photosensitive drum 6 is in contact with the intermediate transfer belt 7. Then, a primary transfer bias is applied to the primary transfer roller 5 at the primary transfer portion T1, so that the toner image formed on the photosensitive drum 6 is sequentially transferred to the intermediate transfer belt 7, and a full-color toner image is formed on the intermediate transfer belt 7. This toner image is conveyed to the secondary transfer portion T2 along with the rotation of the intermediate transfer belt 7.

A sheet fed from the cassette 356 is conveyed toward the secondary transfer portion T2. In other words, the sheet is fed from the cassette 356 by a pick-up roller one by one and conveyed to the secondary transfer portion T2 after a conveyance timing thereof is adjusted with that of the toner image on the intermediate transfer belt 7 by a registration roller 9. Then, a secondary transfer bias is applied to the secondary transfer roller 8 at the secondary transfer portion T2, so that the toner image on the intermediate transfer belt 7 is secondarily transferred onto the sheet. Thereafter, the sheet onto which the toner image is transferred is conveyed to the fixing unit 55, and the fixing unit 55 applies heat and pressure thereto, so that respective colors of toner are fused and mixed together, and thus the toner image is fixed to the sheet as a printed image. The sheet on which the image is fixed is discharged to the discharge port 313 by a discharge roller 18 provided on the downstream side of the fixing unit 55 in a state where the printed face thereof facing downward.

Toner (transfer residual toner) remaining on the surface of the photosensitive drum 6 after the transfer processing is removed and collected from the surface of the photosensitive drum 6 by a cleaning device as a cleaning unit. The cleaning device includes a cleaning blade (not illustrated) as a cleaning member arranged to abut on the photosensitive drum 6 and a toner collection container 2 for storing the transfer residual toner scraped from the surface of the rotating photosensitive drum 6 by the cleaning blade.

When two-sided printing is executed, the sheet on which fixing processing is executed is discharged to the discharge port 313 with its printed face facing downward, conveyed to a conveyance path 57 for two-sided printing by an inverting conveyance roller 17 in a switchback manner by utilizing the internal structure, and fed to the secondary transfer portion T2 again. Then, an image is transferred onto the sheet at the secondary transfer portion T2, and the sheet onto which the image is transferred passes through the fixing unit 55 to be discharged to the discharge port 313 by the discharge roller 18.

A discharge sensor 315, a two-sided conveyance sensor 316, and a pre-registration sensor 317 detect presence or absence of a stagnated printing sheet. Occurrence of a paper jam is detected by these sensors. Either a mechanical flag or an optical sensor can be used for the above sensors.

FIGS. 4A and 4B are diagrams respectively illustrating a moving image list table 400 and a moving image table 410 stored in the storage 111 in FIG. 1. In the present exemplary embodiment, a moving image illustrating a series of operation contents that is displayed at the time of detecting occurrence of a maintenance event such as a lack of toner, a full state of waste toner, or a paper jam, is called as "event occurrence moving image". A moving image illustrating a series of operation contents that is displayed when a user inputs a display instruction of a maintenance method in a state where the maintenance event does not occur is called as "optional reproduction moving image".

FIG. 4A is a diagram illustrating the moving image list table 400. The moving image list table 400 defines a relationship between a maintenance event such as a lack of toner, a full state of waste toner, or a paper jam and a moving image to be reproduced when occurrence of the maintenance event is detected. A maintenance identification (ID) 401 and a moving image list 402 are stored in the moving image list table 400 in association with each other. The maintenance ID 401 is identification information for identifying a maintenance event occurring in the image forming apparatus 100.

In FIG. 4A, a maintenance ID 001 represents a full state of waste toner that is detected by the printer device 106.

Maintenance IDs 002, 003, 004, and 005 respectively represent a lack of black toner, a lack of yellow toner, a lack of magenta toner, and a lack of cyan toner which are also detected by the printer device 106.

Maintenance IDs 006 to 011 represent a lack of toner of two colors, maintenance IDs 012 to 015 represent a lack of toner of three colors, and a maintenance ID 016 represents a lack of toner of all colors, which are also detected by the printer device 106. In addition, "a lack of toner" refers not only to a state where the toner is thoroughly consumed but also to a state where an amount of toner has become less than a predetermined threshold value.

A maintenance ID 017 represents a paper jam at a conveyance portion which is detected by the discharge sensor 315 or the pre-registration sensor 317. A maintenance ID 018 represents a paper jam at a two-sided conveyance portion that is detected by the two-sided conveyance sensor 316. A maintenance ID 019 represents a compound paper jam at the conveyance portion and the two-sided conveyance portion that is detected by either the discharge sensor 315 or the pre-registration sensor 317 and the two-sided conveyance sensor 316.

The moving image list 402 illustrates a list of moving images to be reproduced when each of the maintenance events occurs. When the maintenance event occurs, it is necessary to notify the user of a series of operation contents (i.e., maintenance method) required to solve the maintenance event. For example, the series of operation contents consists of a plurality of operation contents of opening a cover, removing a jammed sheet, and closing a cover. In the below-described exemplary embodiment, a moving image of the corresponding operation content is referred to as "partial moving image". A combination of partial moving images and a reproduction order of each partial moving image are stored in the moving image list 402 in association with the maintenance ID 401. For example, when the maintenance event is a full state of waste toner, a combination of partial moving images may be partial moving images A1, A2, and A3 listed in the corresponding moving image list 402. A reproduction order is an order described in the moving image list 402, so that the partial moving images are reproduced in the order of A1, A2, and A3 when the maintenance event is the full state of waste toner. Similarly, when the maintenance event is a lack of toner or a paper jam, a plurality of partial moving images corresponding to the occurring maintenance event is reproduced in the order described in the moving image list 402.

In the present exemplary embodiment, even in a state where the maintenance event such as a lack of toner, a full state of waste toner, or a paper jam does not occur, the user can optionally check the operation content of replacing a toner container, replacing a toner collection container, or clearing a paper jam. The moving image list table 400 is also used as a table that illustrates a moving image to be displayed when a display instruction of a maintenance method is received from the user in a state where the maintenance event does not occur.

For example, when a display instruction of a replacement operation of a toner collection container is received from the user, partial moving images A1, A2, and A3 corresponding to the maintenance ID 001 are reproduced sequentially. When a display instruction of a replacement operation of a toner container is received from the user, partial moving images B1, B2, B3, B4, B5, B6, B7, B8, B9, and B10 corresponding to the maintenance ID 016 are reproduced sequentially. When a display instruction of a paper jam clearance operation is received from the user, partial moving images C1, C2, C3, and C4 corresponding to a maintenance ID 019 are reproduced sequentially.

The optional reproduction moving image of the present exemplary embodiment has the following characteristics. An optional reproduction moving image of replacement of a toner collection container conforms to a moving image that is to be reproduced when a maintenance event of a full state of waste toner (i.e., when the maintenance ID is "001") occurs. With respect to replacement of a toner container, a maintenance ID 016 is uniquely selected from among maintenance IDs 002 to 016, so that a moving image corresponding to the maintenance ID 016 is reproduced as an optional reproduction moving image. Similarly, with respect to clearance of a paper jam, a maintenance ID 019 is uniquely selected from among maintenance IDs 017 to 019, so that a moving image corresponding to the maintenance ID 019 is reproduced as an optional reproduction moving image.

FIG. 4B is a diagram illustrating the moving image table 410. In the moving image table 410, a moving image ID 411, a moving image file 412, a reproduction time 413, a cover opening/closing flag 414, and a message 415 are associated with each other.

The moving image ID 411 is an ID for identifying a partial moving image which is also used for the moving image list 402 of the moving image list table 400 described above. The moving image file 412 represents a file name of a partial moving image to be reproduced and a position of the partial moving image in the storage 111. Herein, although it is assumed that the partial moving image is stored in the storage 111, the partial moving image can be stored in an external device such as a server connected thereto via a network or a storage device connected thereto via a universal serial bus (USB) cable to be read out as necessary.

The reproduction time 413 is a reproduction time from a start to an end of reproduction of the partial moving image.

The cover opening/closing flag 414 indicates whether the partial moving image illustrates an operation before or after opening a cover of the image forming apparatus 100. The cover opening/closing flag 414 indicates the partial moving image illustrating an operation before opening the cover when a value thereof is "0", and indicates the partial moving image illustrating an operation after opening the cover when a value thereof is "1".

The message 415 is a message to be displayed when a corresponding partial moving image is being reproduced.

Operation contents illustrated in the partial moving image files are as follows.

A partial moving image A1 illustrates the operation content of opening the front cover 202. A partial moving image A2 illustrates the operation content of taking out the toner collection container 2. A partial moving image A3 illustrates the operation content of attaching a new toner collection container and closing the front cover 202.

A partial moving image B1 illustrates the operation content of opening the front cover 202. A partial moving image B2 illustrates the operation content of taking out an empty black toner container, and a partial moving image B3 illustrates the operation content of attaching a new black toner container.

A partial moving image B4 illustrates the operation content of taking out an empty yellow toner container, and a partial moving image B5 illustrates the operation content of attaching a new yellow toner container.

A partial moving image B6 illustrates the operation content of taking out an empty magenta toner container, and a partial moving image B7 illustrates the operation content of attaching a new magenta toner container.

A partial moving image B8 illustrates the operation content of taking out an empty cyan toner container, and a partial moving image B9 illustrates the operation content of attaching a new cyan toner container. A partial moving image B10 illustrates the operation content of closing the front cover 202.

A partial moving image C1 illustrates the operation content of opening the right cover 201. A partial moving image C2 illustrates the operation content of removing a jammed sheet in a vicinity of the discharge sensor 315 and a jammed sheet in a vicinity of the pre-registration sensor 317. A partial moving image C3 illustrates the operation content of removing a jammed sheet in a vicinity of the two-sided conveyance sensor 316. A partial moving image C4 illustrates the operation content of closing the right cover 201.

Description will be provided with reference to the moving image list 402 in FIG. 4A again. For example, when a paper jam occurs at the conveyance portion (i.e., when the maintenance ID is "017"), at first, the partial moving image C1 illustrating an operation of opening the right cover 201 is reproduced. Then, the partial moving image C2 illustrating an operation of removing the jammed sheets in the vicinities of the discharge sensor 315 and the pre-registration sensor 317 and the partial moving image C4 illustrating an operation of closing the right cover 201 are reproduced in that order. Herein, the partial moving image C2 illustrates the operation content of clearing a paper jam at the conveyance portion as a maintenance event, and the partial moving image C1 illustrates the operation content of preparing for that operation. In the below-described exemplary embodiment, a partial moving image illustrating a content of the operation executed prior to the operation as an actual solution to the maintenance event is called as "prior preparation moving image". A partial moving image illustrating the operation as a solution to the maintenance event, i.e., a partial moving image illustrating the operation to be executed after the operation illustrated in the prior preparation moving image is executed, is called as "main content moving image". For example, when the maintenance ID is "001", the partial moving image A1 is the prior preparation moving image, and the partial moving images A2 and A3 are the main content moving images. When the maintenance ID is "002", the partial moving image B1 is the prior preparation moving image, and the partial moving images B2, B3, and B10 are the main content moving images. When the maintenance ID is "017", the partial moving image C1 is the prior preparation moving image, and the partial moving images C2 and C4 are the main content moving images. In the present exemplary embodiment, a partial moving image associated with the cover opening/closing flag 414 having a value "0" is specified as the prior preparation moving image, and a partial moving image associated with the cover opening/closing flag 414 having a value "1" is specified as the main content moving image.

FIGS. 5A to 5H, FIGS. 6A and 6B, and FIGS. 7A to 7D are diagrams illustrating examples of screens displayed on the display device 115 according to the present exemplary embodiment. Hereinafter, a general overview of transition of display screens in the present exemplary embodiment will be described with reference to FIGS. 5A to 5H, FIGS. 6A and 6B, and FIGS. 7A to 7D. The CPU 101 executes a program stored in the storage 111 to generate display data, so that the screens in FIGS. 5A to 5H, FIGS. 6A and 6B, and FIGS. 7A to 7D are displayed on the display device 115 via the display control unit 114.

<Display Procedure of Event Occurrence Moving Image>

Figure 5A:
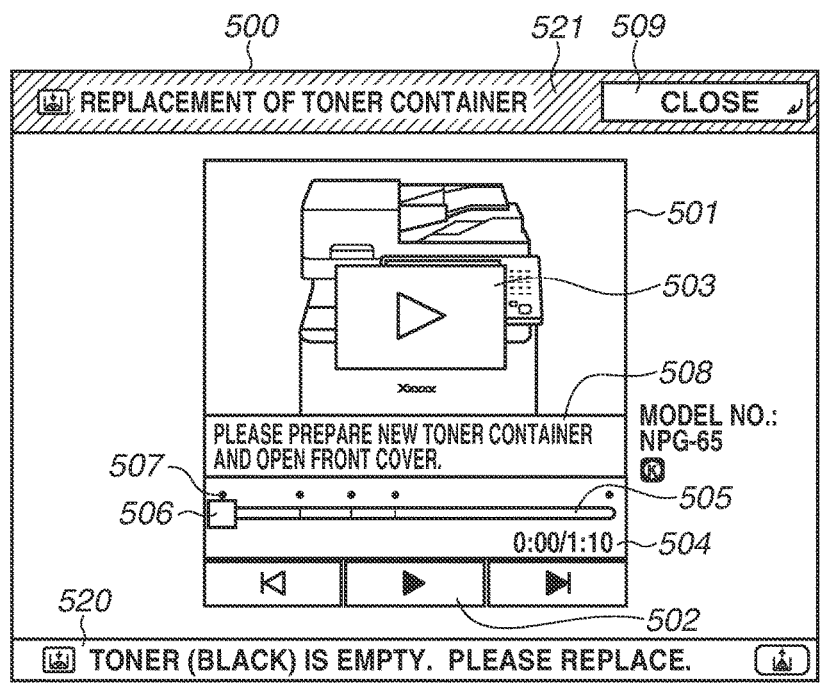
FIGS. 5A, 5B, 5C, 5D, 5E, 5F, 5G, and 5H are diagrams illustrating examples of screens displayed on a display device 115 according to a first exemplary embodiment.

FIG. 5A is a diagram illustrating an example of a maintenance screen firstly displayed when occurrence of the maintenance event is detected. Herein, display procedure to be performed at the time of detecting occurrence of a lack of black toner (when the maintenance ID is "002") will be described as an example. According to the moving image list table 400, when the maintenance ID is "002", partial moving images having the moving image IDs B1, B2, B3, and B10 are reproduced sequentially. In FIG. 5A, a screen in which the partial moving image B1 as a prior preparation moving image is stopped at the beginning is displayed.

A moving image display region 501, a reproduction button 502, a reproduction mark 503, a reproduction time display label 504, a bar 505, a slider 506, a chapter 507, a message region 508, and a close button 509 are displayed on a maintenance screen 500. A status display region 520 and a title display region 521 are displayed on the maintenance screen 500.

The moving image display region 501 is a region for displaying the event occurrence moving image. The reproduction button 502 is a button for providing a reproduction instruction of the moving image. Similar to the reproduction button 502, the reproduction mark 503 is a mark for providing a reproduction instruction of the moving image. When the reproduction button 502 or the reproduction mark 503 is pressed (touched), the CPU 101 starts reproducing the moving image.

The reproduction time display label 504 illustrates a total of reproduction times of a plurality of reproduction partial moving images (referred to as "total reproduction time") and a time corresponding to a current reproduction position with respect to the total reproduction time.

The bar 505 and the slider 506 indicate a reproduction position in the entire moving image, and constitute a seeking bar which allows the user to provide an instruction of moving the reproduction position. The bar 505 schematically illustrates the total reproduction time. The slider 506 illustrates a current reproduction position, and the user uses the slider 506 to move a reproduction position. The slider 506 moves within a range of the bar 505 according to a reproduction state of the moving image. The user can move the reproduction position to an optional position by dragging (moving) the slider 506. When an optional position of the bar 505 is pressed, reproduction of the moving image can be started from that position, and the slider 506 also moves according to the reproduction position. The chapter 507 indicates a sectioning position of the moving image.

The reproduction time display label 504 and the chapter 507 will be described specifically. According to the moving image list table 400, when the maintenance ID is "002", partial moving images B1, B2, B3, and B10 are reproduced sequentially. According to the moving image table 410, reproduction times of the partial moving images B1, B2, B3, and B10 are 13 seconds (00:13), 10 seconds (00:10), 30 seconds (00:30), and 17 seconds (00:17) respectively. In the above, the total reproduction time is 1 minute 10 seconds (01:10) because the total reproduction time is a sum of the reproduction times of the partial moving images to be reproduced. The reproduction time represents a current reproduction position with respect to the total reproduction time. For example, it is assumed that a scene after 5 seconds (00:05) from the beginning of the partial moving image B1 as a first reproduction moving image is displayed. In this case, this 5 seconds is simply taken as a reproduction time. It is assumed that a scene after 10 seconds from the beginning of the partial moving image B2 as a second reproduction moving image is displayed. In this case, because reproduction of the partial moving image B1 is completed, 13 seconds as a reproduction time of the partial moving image B1 and 10 seconds as a time of the reproduced partial moving image B2 is added together, so that the reproduction time is calculated as 23 seconds (00:23). The reproduction time display label 504 is displayed as a character string in which the reproduction time calculated as the above and the total reproduction time are connected with a slash mark "/".

The chapter 507 is displayed at a sectioning position of a series of operation contents. The chapter 507 is displayed at three positions where reproduction of a partial moving image is switched (i.e., sectioning positions between the partial moving images B1 and B2, B2 and B3, and B3 and B10). The chapter 507 can also be displayed at two positions at the beginning and the end of the entire moving image. In the example illustrated in FIG. 5A, the chapter 507 is displayed at five positions.

A message for supplementing the content of the reproducing moving image is displayed on the message region 508. More specifically, when the partial moving image B1 is being reproduced, a message "PLEASE PREPARE NEW TONER CONTAINER AND OPEN FRONT COVER." is displayed based on the message 415 in the moving image table 410. In addition, the message region 508 can be hidden when a predetermined time has passed after starting reproduction of the corresponding partial moving image, or can be continuously displayed continuously while the corresponding partial moving image is being displayed. The close button 509 is a button for hiding the maintenance screen 500 displayed thereon.

The status display region 520 is a region for displaying a message corresponding to the maintenance event occurring in the image forming apparatus 100. When a plurality of maintenance events occurs, messages corresponding to respective maintenance events are alternately displayed in the status display region 520. In FIG. 5A, a message corresponding to a lack of black toner, i.e., "TONER (BLACK) IS EMPTY. PLEASE REPLACE." is displayed.

The title display region 521 is a region for displaying a title of the maintenance method displayed thereon.

Figure 5B:
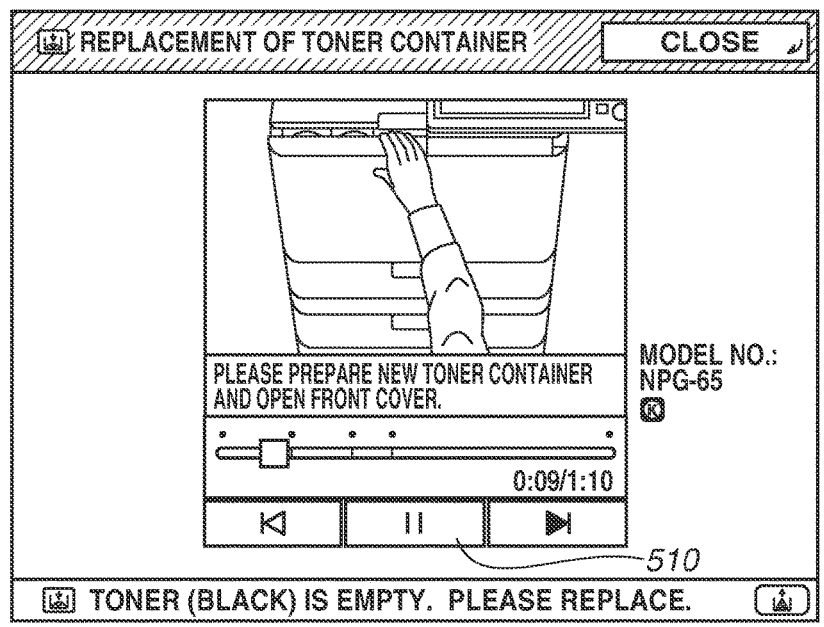

When the reproduction button 502 or the reproduction mark 503 is pressed at the screen in FIG. 5A, reproduction of the moving image is started. When the maintenance ID is "002", the CPU 101 starts reproducing the partial moving image B1 as a prior preparation moving image. FIG. 5B illustrates an example of a screen after 9 seconds from a start of reproduction of the partial moving image B1. According to the start of reproduction of the moving image, the reproduction button 502 and the reproduction mark 503 are hidden, and a pause button 510 is displayed at the same position in place of the reproduction button 502.

Figure 5C:
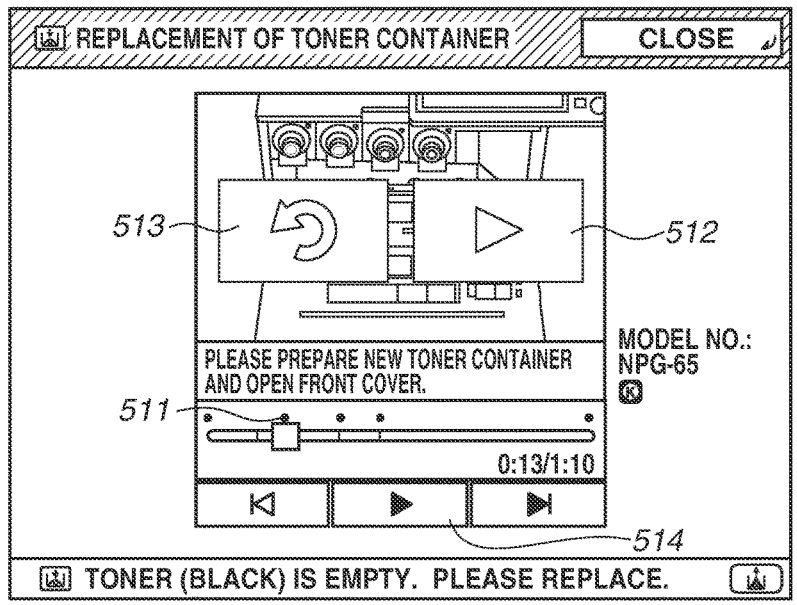

FIG. 5C is a diagram illustrating an example of the screen when the reproduction position has reached the end of the partial moving image B1. Reproduction of the moving image is automatically stopped tentatively at a time point at which reproduction of the partial moving image B1 is ended, i.e., at a position of a chapter 511. Then, a replay mark 513 is displayed together with the reproduction mark 512. The pause button 510 is hidden, and the reproduction button 514 is displayed at the same position. The replay mark 513 is a mark for providing an instruction of reproducing the paused partial moving image from the beginning. More specifically, when the replay mark 513 is pressed when the moving image is stopped at a position of the chapter 511, the CPU 101 moves the reproduction position to the beginning of the partial moving image B1 and restarts reproduction of the moving image.

Figure 5D:
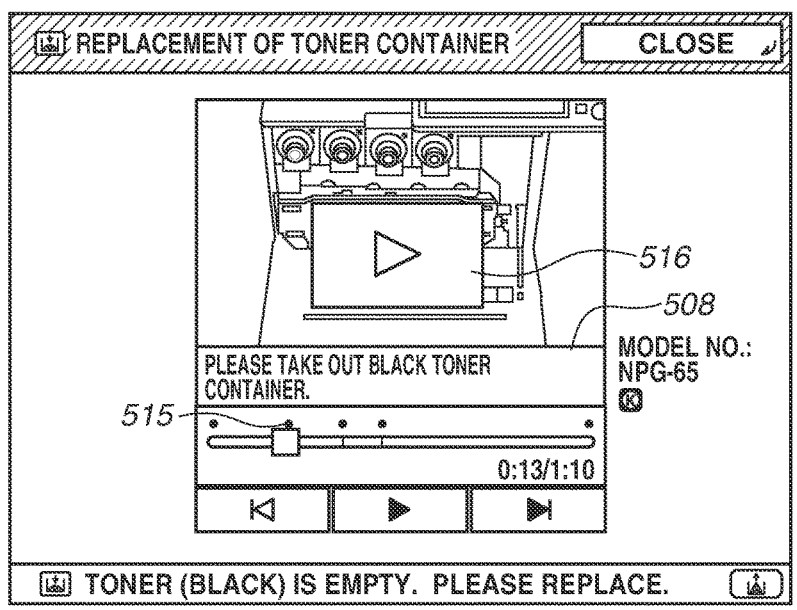

FIG. 5D is a diagram illustrating an example of a screen displayed in a case where opening of the front cover 202 is detected when the partial moving image B1 is being reproduced. In a case where opening of the front cover 202 is detected, the CPU 101 automatically ends the reproduction of the partial moving image B1 and displays a screen in which the partial moving image B2 as a first part of the main content moving image is stopped at the beginning (i.e., chapter 515). In this case, only the reproduction mark 516 is displayed. By displaying only the reproduction mark 516, it is possible to prompt the user to see a moving image illustrating the operation performed next. A message corresponding to the partial moving image B2, "PLEASE TAKE OUT BLACK TONER CONTAINER." is displayed in the message region 508. In addition, if the front cover 202 has already been opened, the replay mark 513 is not displayed because the partial moving image B1 does not have to be reproduced again.

As described above, in the display procedure of the event occurrence moving image, the moving image automatically proceeds (skips) to the main content moving image when the operation illustrated in the prior preparation moving image is completed, so that the user can comfortably starts the next operation.

Figure 5E:
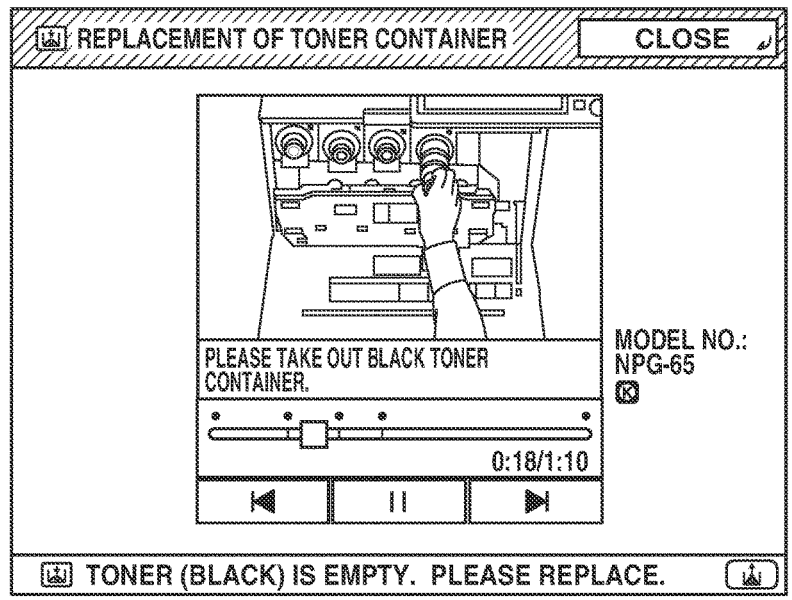

When the reproduction mark 512 (516) or the reproduction button 514 is pressed at the screen in FIG. 5C or 5D, reproduction of the partial moving image B2 is started. FIG. 5E is a diagram illustrating an example of a screen after 5 seconds from a start of reproduction of the partial moving image B2.

Figure 5F:
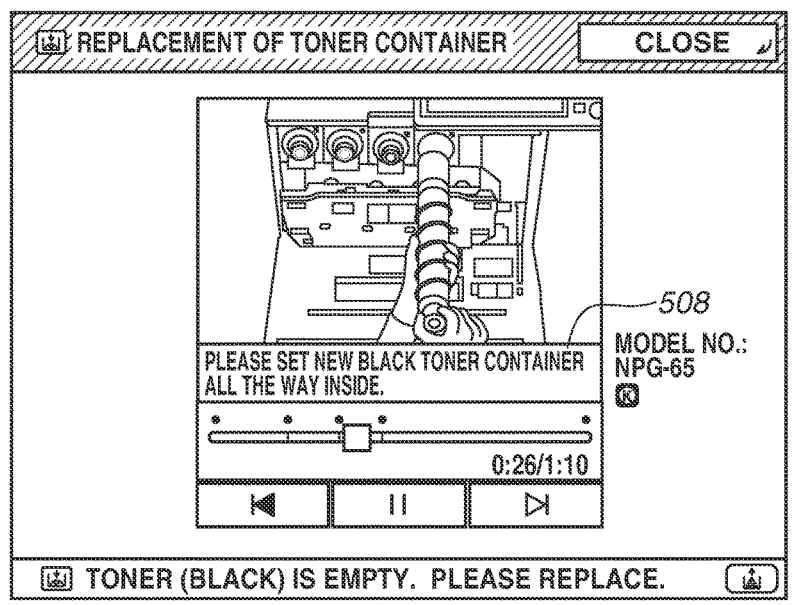

FIG. 5F is a diagram illustrating an example of a screen after 3 seconds from a start of reproduction of the partial moving image B3. In the screen in FIG. 5F, a message corresponding to the partial moving image B3, "PLEASE SET NEW BLACK TONER CONTAINER ALL THE WAY INSIDE." is displayed in the message region 508.

Figure 5G:
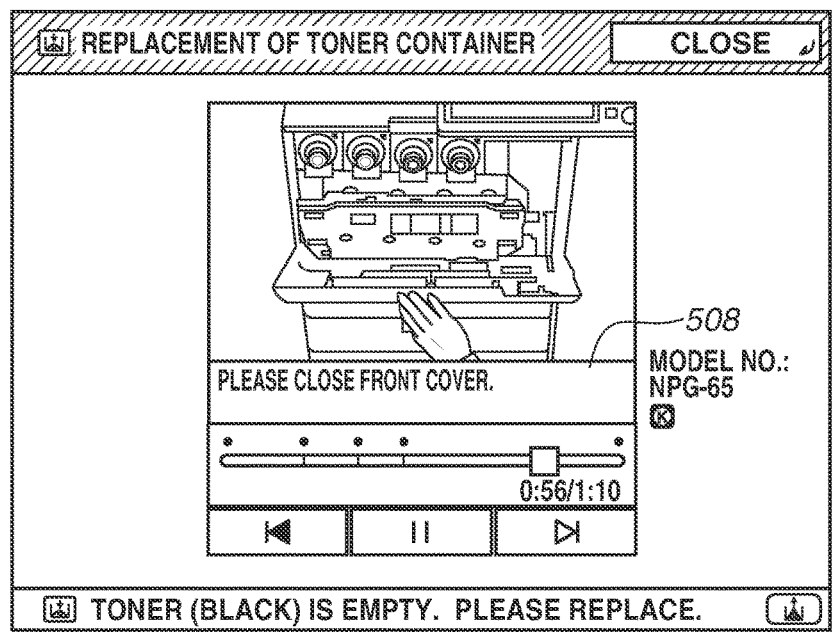

FIG. 5G is a diagram illustrating an example of a screen after 3 seconds from a start of reproduction of the partial moving image B10. In the screen in FIG. 5G, a message corresponding to the partial moving image B10, "PLEASE CLOSE FRONT COVER." is displayed in the message region 508.

Figure 5H:
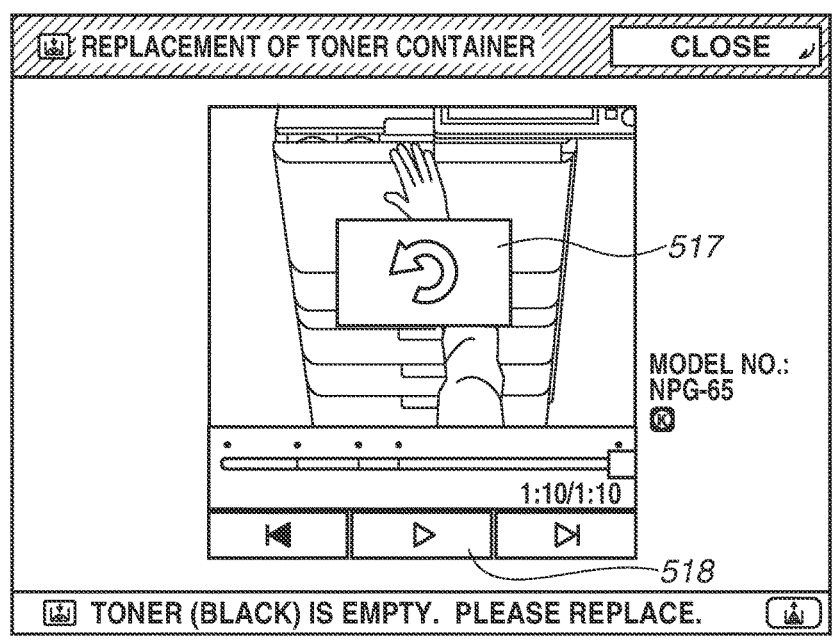

FIG. 5H is a diagram illustrating an example of the screen when the reproduction position reaches the end of the entire moving image (i.e., the end of the partial moving image B10 when the maintenance ID is "002"). In this case, only the replay mark 517 is displayed without the reproduction mark because a next partial moving image to be displayed does not exist. In addition, in order to indicate that the reproduction button 518 is not operable, the reproduction button 518 is grayed out.

As described above, when a plurality of partial moving images corresponding to the occurring maintenance event is reproduced to the end, a screen different from a screen displayed when the moving image is tentatively stopped is displayed, and thus the user can recognize that the moving image is reproduced to the end.

Figure 6A:
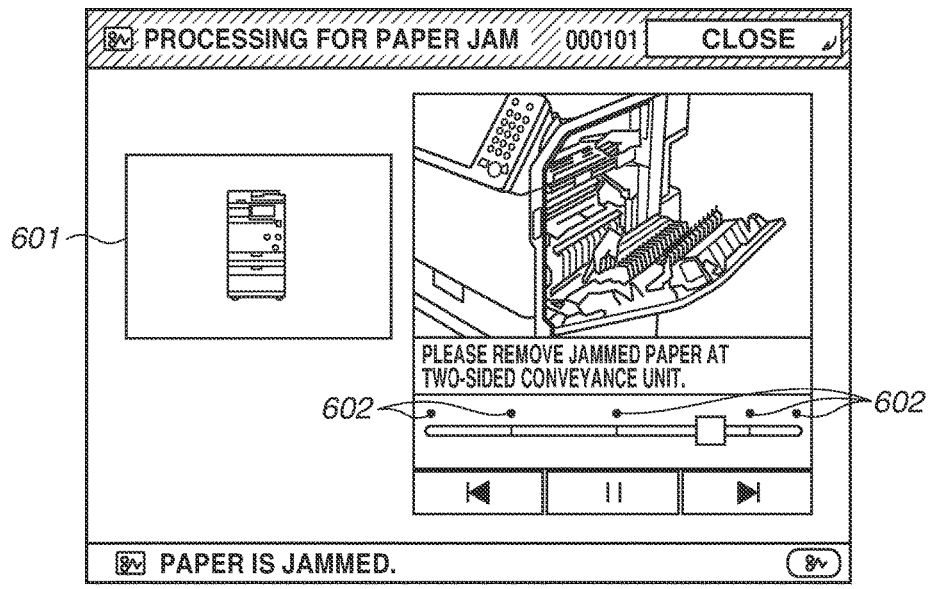
FIGS. 6A and 6B are diagrams illustrating examples of screens displayed on the display device 115 according to the first exemplary embodiment.

FIG. 6A is a diagram illustrating a state where occurrence of a compound paper jam at the conveyance portion and the two-sided conveyance portion is detected (i.e., maintenance ID is "019"), so that a screen in which a corresponding moving image is reproduced halfway is displayed.

An icon 601 indicates a portion at which the paper jam has occurred in the image forming apparatus 100. More specifically, when the maintenance ID is "019", the compound paper jam occurs at the conveyance portion and the two-sided conveyance portion, so that the icon 601 indicates that the paper jam occurs at the conveyance portion and the two-sided conveyance portion. According to the moving image list table 400, when the maintenance ID is "019", partial moving images having the moving image IDs C1, C2, C3, and C4 are reproduced sequentially. A chapter 602 is displayed at the beginning and the end of the moving image as well as the sectioning positions of the respective partial moving images. In the example of the screen illustrated in FIG. 6A, reproduction of the partial moving image C2 illustrating the procedure of removing jammed sheets in the vicinities of the discharge sensor 315 and the pre-registration sensor 317 ends, and the partial moving image C3 illustrating the procedure of removing the jammed sheet in the vicinity of the two-sided conveyance sensor 316 is reproduced halfway. It is assumed that the user has already removed a jammed sheet in the vicinity of the discharge sensor 315 or the pre-registration sensor 317 according to the procedure illustrated in the partial moving image C2.

Figure 6B:
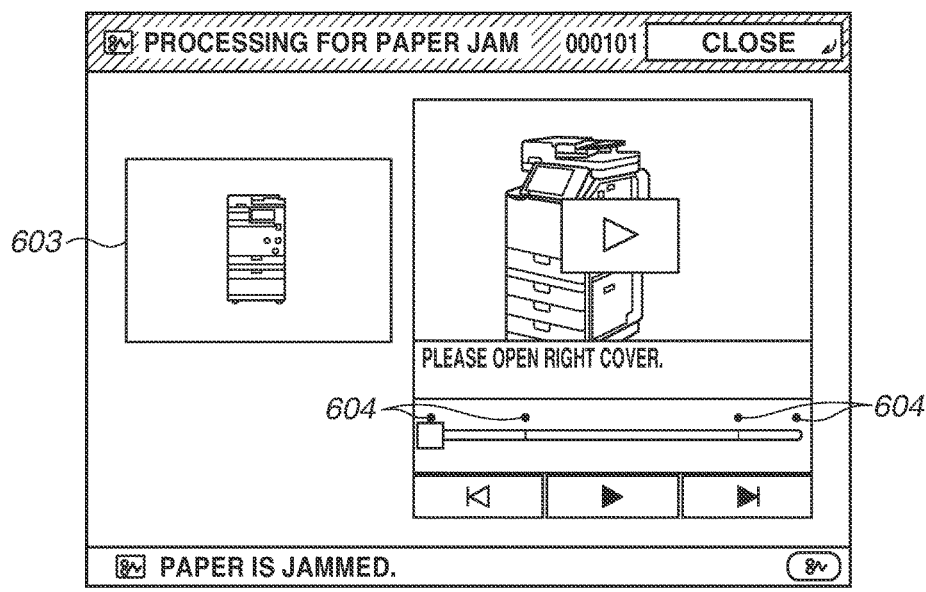

FIG. 6B is a diagram illustrating an example of a screen displayed in a case where closing of the right cover 201 is detected when the screen in FIG. 6A is being displayed. In this case, although a paper jam at the conveyance portion is cleared, a paper jam at the two-sided conveyance portion has not yet cleared. Thus, the CPU 101 updates the maintenance ID and switches the display to the moving image corresponding to the paper jam at the two-sided conveyance portion (when the maintenance ID is "018"). More specifically, according to the moving image list table 400, when the maintenance ID is "018", partial moving images having the moving image IDs C1, C3, and C4 are reproduced sequentially. Accordingly, the CPU 101 displays a screen in which the partial moving image C1 is stopped at the beginning. Display of the icon 603 and the chapter 604 are also updated.

As described above, in the display procedure of the event occurrence moving image, the maintenance event occurring in the image forming apparatus 100 is confirmed again when closing of the cover is detected, and the moving image to be reproduced is also updated accordingly. Thus, when the user performs the operation for solving a plurality of maintenance events such as a paper jam at the conveyance portion and a paper jam at the two-sided conveyance portion, the user can check to what extent the operation has been safely completed by closing the cover.

<Display Procedure of Optional Reproduction Moving Image>

FIGS. 7A to 7D are diagrams illustrating examples of screens displayed in a case where the user checks a series of operation contents required to solve a maintenance event in a state where the maintenance event does not occur. In the below-described exemplary embodiment, it is assumed that a user provides an instruction for checking the operation content of replacing a toner container, replacing a toner collection container, or clearing a paper jam in a state where a maintenance event such as a lack of toner, a full state of waste toner, or a paper jam does not occur.

First, the user operates the input device 113 to display a confirmation screen 700 of a maintenance method on the display device 115. The confirmation screen 700 of a maintenance method is a selection screen for selecting a maintenance method which the user would like to check from among respective maintenance methods corresponding to the maintenance events of a plurality of types.

Figure 7A:
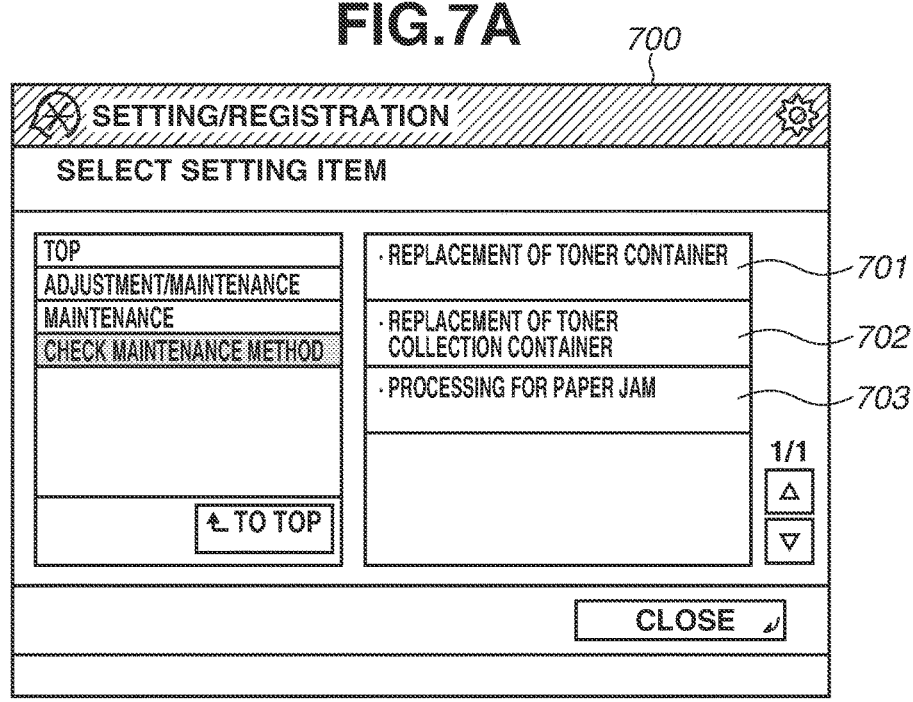
FIGS. 7A, 7B, 7C, and 7D are diagrams illustrating examples of screens displayed on the display device 115 according to the first exemplary embodiment.
Figure 7B:
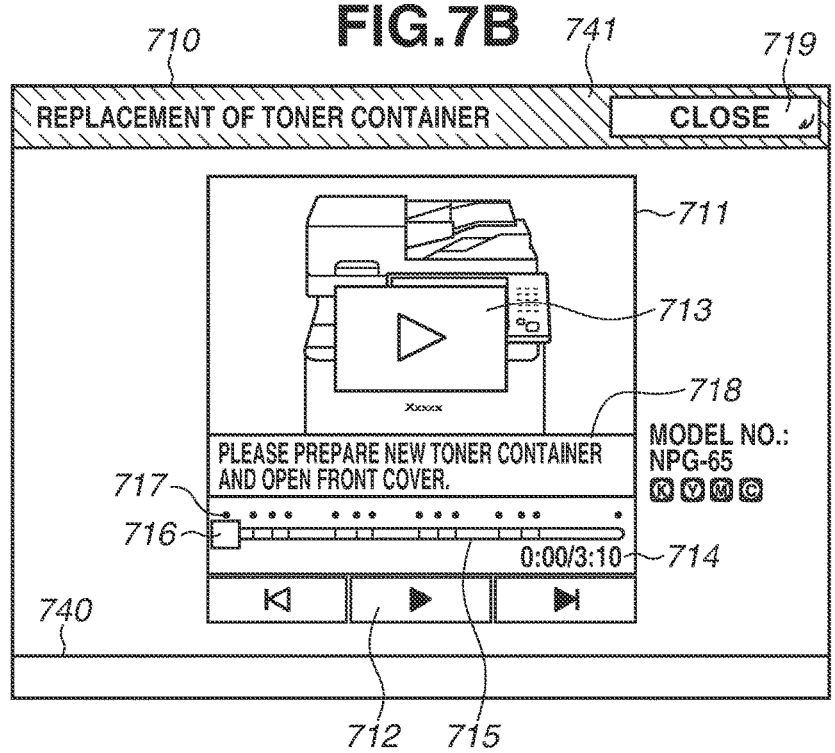

When a menu 701 "REPLACEMENT OF TONER CONTAINER" is selected in FIG. 7A, as illustrated in FIG. 7B, a maintenance screen 710 including a moving image illustrating the operation content corresponding to replacement of a toner container is displayed.

A moving image display region 711, a reproduction button 712, a reproduction mark 713, a reproduction time display label 714, a bar 715, a slider 716, a chapter 717, a message region 718, a close button 719, and a status display region 740 are displayed on the maintenance screen 710. The moving image display region 711 is a region for displaying an optional reproduction moving image. In addition, as illustrated in FIG. 7B, in a state where a maintenance event does not occur, a message corresponding to the maintenance event is not displayed in the status display region 740.

As with the case of the event occurrence moving image described in FIGS. 5A to 5H, when the reproduction button 712 or the reproduction mark 713 is pressed, reproduction of the moving image is started. Then, the reproduction button 712 and the reproduction mark 713 are hidden, and the pause button is displayed at the same position in place of the reproduction button 712. Then, when the moving image is reproduced to the end of the partial moving image, reproduction of the moving image is tentatively stopped, and a replay mark is displayed together with the reproduction mark 713.

In addition, when the optional reproduction moving image is being displayed, the display is not switched to the main content moving image automatically even if a corresponding cover (in case of replacement of the toner container, the front cover 202) is opened. This is because the optional reproduction moving image is displayed for the purpose of illustrating an overview of the maintenance operation to the user, and thus it is not necessary to switch the display to a moving image illustrating a next operation in cooperation with the operation of the user.

Herein, when the maintenance screen 500 in FIG. 5A and the maintenance screen 710 in FIG. 7B are compared to each other, the title display region 521 of the maintenance screen 500 and the title display region 741 of the maintenance screen 710 are displayed in different colors. The title display region 521 of the maintenance screen 500 is displayed in orange, a color highly effective in drawing attention, whereas the title display region 741 of the maintenance screen 710 is displayed in gray, a color less effective in drawing attention. In FIGS. 5A and 7B, different types of hatched lines are used for expressing the different colors.

As described above, even if the moving image reproduced in the moving image display region 501 and the moving image reproduced in the moving image display region 711 are the same, the user can distinguish whether the displayed moving image is the event occurrence moving image or the optional reproduction moving image based on difference in colors of the title display regions 521 and 741. In addition, another display method may be used as long as the event occurrence moving image and the optional reproduction moving image can be distinguished from one another. For example, different colors can be used for the characters displayed in the title display regions 521 and 741, or different background colors can be used for the moving image display regions 501 and 711. The above-described display methods can be combined as appropriate.

According to the moving image list table 400, when "REPLACEMENT OF TONER CONTAINER" is selected (i.e., when the maintenance ID is "016"), partial moving images having the moving image IDs B1, B2, B3, B4, B5, B6, B7, B8, B9, and B10 are reproduced sequentially. In FIG. 7B, a screen in which the partial moving image B1 as a prior preparation moving image is stopped at the beginning is displayed. The maintenance screen 710 is hidden when the close button 719 is pressed at the screen in FIG. 7B.

Figure 7C:
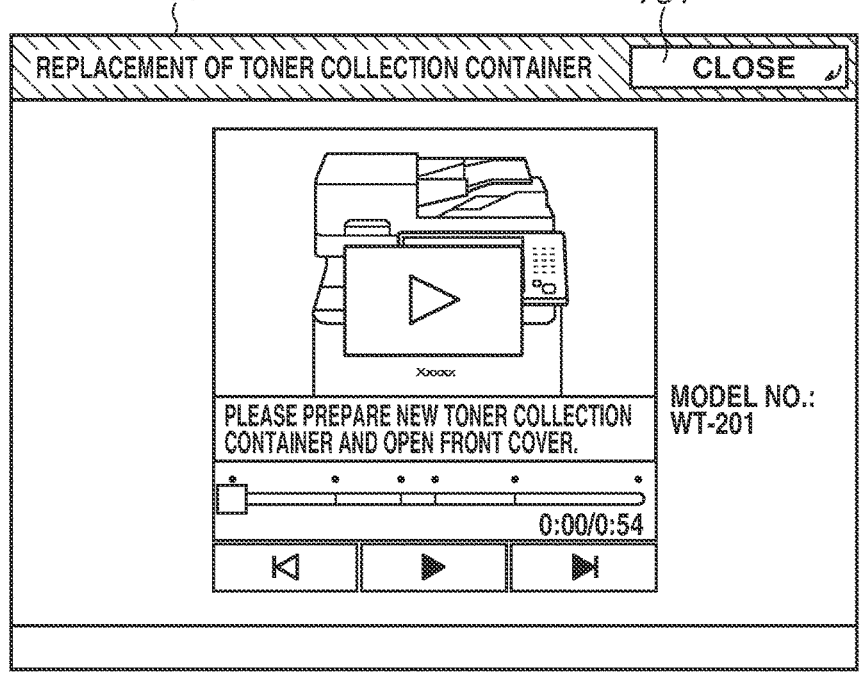

When a menu 702 "REPLACEMENT OF TONER COLLECTION CONTAINER" is selected in FIG. 7A, as illustrated in FIG. 7C, a maintenance screen 750 illustrating a moving image illustrating the operation content corresponding to replacement of a toner collection container is displayed. According to the moving image list table 400, when "REPLACEMENT OF TONER COLLECTION CONTAINER" is selected (i.e., when the maintenance ID is "001"), partial moving images having the moving image IDs A1, A2, and A3 are reproduced sequentially. In FIG. 7C, a screen in which the partial moving image A1 as a prior preparation moving image is stopped at the beginning is displayed. The maintenance screen 750 is hidden when the close button 751 is pressed at the screen in FIG. 7C.

Figure 7D:
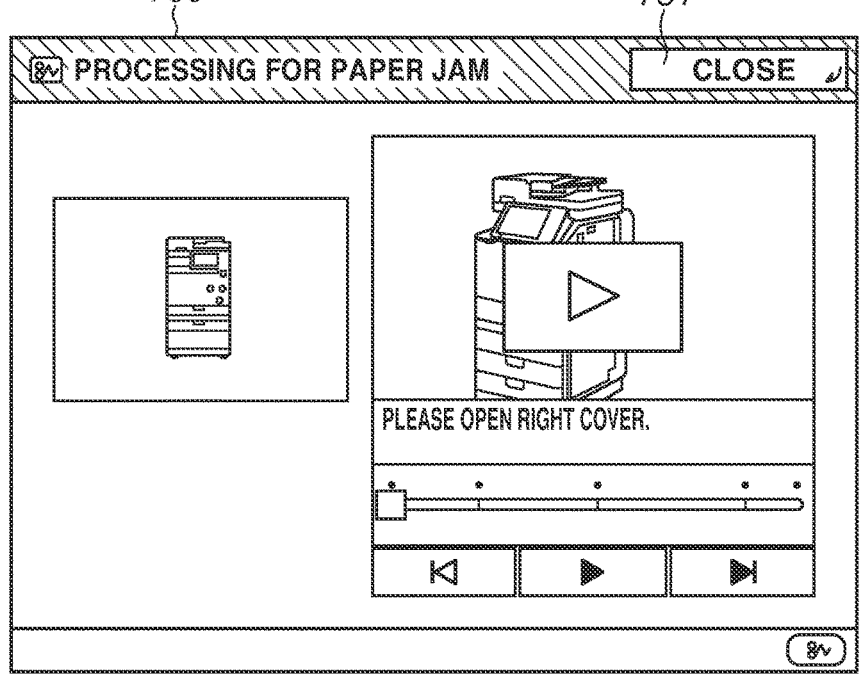

When a menu 703 "PROCESSING FOR PAPER JAM" is selected in FIG. 7A, as illustrated in FIG. 7D, a maintenance screen 760 including a moving image illustrating the operation content corresponding to clearance of a paper jam is displayed. According to the moving image list table 400, when "PROCESSING FOR PAPER JAM" is selected (i.e., when the maintenance ID is "019"), partial moving images having the moving image IDs C1, C2, C3, and C4 are reproduced sequentially. In FIG. 7D, a screen in which the partial moving image C1 as a prior preparation moving image is stopped at the beginning is displayed. The maintenance screen 760 is hidden when the close button 761 is pressed at the screen in FIG. 7D. As described above, in the display procedure of the optional reproduction moving image, even in a state where the maintenance event does not occur, the user can optionally check the operation content of replacing a toner container, replacing a toner collection container, or clearing a paper jam through the moving image.

Subsequently, display processing of a moving image illustrating a maintenance method will be described with reference to FIG. 8. The CPU 101 implements respective steps of the flowchart illustrated in FIG. 8 by executing a program stored in the storage 111.

FIG. 8 is a flowchart illustrating display processing of a moving image illustrating a maintenance method according to the present exemplary embodiment. The processing illustrated in this flowchart is realized by the CPU 101 executing a program stored in the storage 111.

First in step S801, the CPU 101 determines whether a maintenance event such as a lack of toner, a full state of waste toner, or a paper jam has occurred. Occurrence of a lack of toner or a full state of waste toner is detected by the printer device 106. Occurrence of a paper jam is detected by the discharge sensor 315, the two-sided conveyance sensor 316, or the pre-registration sensor 317. The CPU 101 specifies a maintenance ID for identifying a detected maintenance event. For example, if a lack of black toner has occurred, the CPU 101 specifies the maintenance ID as "002".

If the CPU 101 determines that a certain maintenance event has occurred in step S801 (YES in step S801), the processing proceeds to step S802.

In step S802, the CPU 101 sets a display flag of the event occurrence moving image to ON. If the CPU 101 determines that none of the maintenance events has occurred in step S801 (NO in step S801), the processing proceeds to step S803.

In step S803, the CPU 101 determines whether an instruction to display the operation content of replacing toner container, replacing toner collection container, or clearing a paper jam is received. For example, the CPU 101 determines whether any one of the menu 701 "REPLACEMENT OF TONER CONTAINER", the menu 702 "REPLACEMENT OF TONER COLLECTION CONTAINER", and the menu 703 "PROCESSING FOR PAPER JAM" is selected. The CPU 101 specifies a maintenance ID corresponding to a selected menu. For example, if the menu 701 "REPLACEMENT OF TONER CONTAINER" is selected, the CPU 101 specifies the maintenance ID as "016".

If the CPU 101 determines that an instruction to display a certain operation content is received in step S803 (YES in step S803), the processing proceeds to step S804.

In step S804, the CPU 101 sets a display flag of the optional reproduction moving image to ON. If the CPU 101 determines that no display instruction is received in step S803 (NO in step S803), the processing returns to step S801.

Next, in step S805, the CPU 101 refers to the moving image list table 400 and acquires a list of partial moving images corresponding to the maintenance ID specified in step S801 or S803. For example, if the specified maintenance ID is "002", partial moving images B1, B2, B3, and B10 are reproduced. The CPU 101 temporarily stores the plurality of specified partial moving images in the RAM 104 in that reproduction order, for example, as arrangement information.

Then, in step S806, the CPU 101 reads a partial moving image corresponding to a first moving image ID and outputs the moving image to the display device 115 in a stopped state. At this time, based on the content of the display flag set in step S802 or S804, the CPU 101 controls the moving image to be displayed as the event occurrence moving image or the optional reproduction moving image. As described above, different colors are used for the title display regions between the event occurrence moving image and the optional reproduction moving image. For example, if the maintenance ID is "002" and the display flag of the event occurrence moving image is set to ON, the CPU 101 reads the partial moving image B1 as a prior preparation moving image to the RAM 104 and outputs the partial moving image B1 to the display device 115 in a stopped state. In this way, a screen illustrated in FIG. 5A is displayed on the display device 115. If the maintenance ID is "016" and the display flag of the optional reproduction moving image is set to ON, the CPU 101 reads the partial moving image B1 as a prior preparation moving image to the RAM 104 and outputs the partial moving image B1 to the display device 115 in a stopped state. In this way, a screen illustrated in FIG. 7B is displayed on the display device 115. Thereafter, as illustrated in FIGS. 5A to 5H, FIGS. 6A and 6B, and FIGS. 7A to 7D, reproduction of the moving image is started according to the user's operation of starting the reproduction.

In step S807, the CPU 101 determines whether a cover corresponding to the displayed moving image is opened or closed, or a close button is pressed. For example, if a lack of black toner (the maintenance ID is "002") occurs, the partial moving image B1 illustrating the operation content of opening the front cover 202 is included in the displayed moving image. Thus, based on a detection result of the sensor for the front cover 202, the CPU 101 determines whether the front cover 202 is opened (whether the state of the cover is changed from a closed state to an opened state) or closed (whether the state of the cover is changed from the opened state to the closed state). If the CPU 101 determines that the corresponding cover is opened ("COVER IS OPENED" in step S807), the processing proceeds to step S808.

In step S808, based on the content of the display flag set in step S802 or S804, the CPU 101 determines whether the displayed moving image is the event occurrence moving image or the optional reproduction moving image. If the CPU 101 determines that the event occurrence moving image is being displayed (YES in step S808), the processing proceeds to step S809. In step S809, the CPU 101 reads the first partial moving image illustrating the operation content after opening the cover to the RAM 101 based on the cover opening/closing flag 414 of the moving image table 410. Then, the CPU 101 outputs the read partial moving image to the display device 115 in a stopped state, thereby switching the display to a beginning of the main content moving image. For example, when the maintenance ID is "002", a first part of the main content moving image, i.e., a first partial moving image indicated by the cover opening/closing flag 414 having a value "1", is the partial moving image B2. In this way, a screen illustrated in FIG. 5D is displayed on the display device 115. According to the present processing, even if opening of the corresponding cover is detected while the main content moving image is being reproduced, the display is also automatically switched to the beginning of the main content moving image. For example, when the maintenance ID is "002" and opening of the front cover 202 is detected when the partial moving image B3 as the main content moving image is being reproduced, the CPU 101 switches the display to the screen illustrated in FIG. 5D. With this configuration, the operation to be performed next can be illustrated even in a case where the user erroneously starts reproducing the main content moving image before the user opens the cover, and thus the user's overlooking the operation content can be prevented.

If the CPU 101 determines the optional reproduction moving image is being displayed in step S808 (NO in step S808), the processing returns to step S807 without the display being automatically switched to the beginning of the main content moving image.

In step S807, if the CPU 101 determines that the cover that has been opened is closed ("COVER IS CLOSED" in step S807), the processing proceeds to step S810. In step S810, based on the content of the display flag set in step S802 or S804, the CPU 101 determines whether the displayed moving image is the event occurrence moving image or the optional reproduction moving image. If the CPU 101 determines that the event occurrence moving image is being displayed (YES in step S810), the processing proceeds to step S811. In step S811, the CPU 101 determines whether all of the maintenance events are solved. For example, in a case where a compound paper jam at the conveyance portion and the two-sided conveyance portion occurs, and the right cover 201 is closed while the moving image corresponding thereto is being reproduced, the CPU 101 determines whether the compound paper jam is solved based on the detection results of the discharge sensor 315, the two-sided conveyance sensor 316, and the pre-registration sensor 317.

If the CPU 101 determines that all of the maintenance events are solved in step S811 (YES in step S811), the processing proceeds to step S812. In step S812, the CPU 101 hides the event occurrence moving image and sets the display flag of the event occurrence moving image to OFF. In this way, display processing of the event occurrence moving image is ended.

If the CPU 101 determines that not all of the maintenance events are solved in step S811 (NO in step S811), the processing proceeds to step S813. In step S813, the CPU 101 determines whether there is any change in the occurring maintenance event. For example, in a case where a compound paper jam at the conveyance portion and the two-sided conveyance portion has occurred, the CPU 101 determines whether any one of the paper jams at the conveyance portion and the two-sided conveyance portion is solved based on the detection results of the discharge sensor 315, the two-sided conveyance sensor 316, and the pre-registration sensor 317.

If the CPU 101 determines that there is a change in the occurring maintenance event in step S813 (YES in step S813), the processing proceeds to step S814. In step S814, the CPU 101 hides the event occurrence moving image, and then returns the processing to step S805. For example, in a case where a compound paper jam has occurred, and the user removes the jammed sheets in the vicinities of the discharge sensor 315 and the pre-registration sensor 317 and closes the right cover 201 while the partial moving image is being reproduced, the CPU 101 determines that the maintenance event has been changed to a paper jam at the two-sided conveyance portion and specifies the maintenance ID as "018". If the maintenance ID is specified as "018", the partial moving images to be reproduced are the partial moving images C1, C3, and C4. Then, the CPU 101 reads the partial moving image C1 as a prior preparation moving image to the RAM 104 and outputs the partial moving image C1 to the display device 115 in a stopped state. In this way, the display is switched from the screen illustrated in FIG. 6A to the screen illustrated in FIG. 6B.

If the CPU 101 determines that there is no change in the occurring maintenance event in step S813 (NO in step S813), the processing proceeds to step S815. In step S815, the CPU 101 switches the display to the beginning of the prior preparation moving image, and then returns the processing to step S807.

In step S807, if the CPU 101 determines that the close button is pressed ("CLOSE BUTTON IS PRESSED" in step S807), the processing proceeds to step S816. In step S816, the CPU 101 hides the moving image that has been displayed. If the event occurrence moving image has been displayed, the CPU 101 sets the display flag of the event occurrence moving image to OFF. If the optional reproduction moving image has been displayed, the CPU 101 sets the display flag of the optional reproduction moving image to OFF. In this way, display processing of the moving image ends.

As described above, according to the present exemplary embodiment, even in a state where the maintenance event such as a lack of toner or a paper jam does not occur, the user can check the operation content of replacing a toner container, replacing a toner collection container, or clearing a paper jam through the moving image at a desired timing. With this configuration, even if the maintenance event does not occur, the user can previously check a series of operation contents required to solve the maintenance event, and thus the usability of the image forming apparatus can be improved. Because the title display region of the optional reproduction moving image is displayed in a color different from that of the event occurrence moving image, the user can easily identify whether the currently-displayed moving image is the event occurrence moving image or the optional reproduction moving image.

Next, a second exemplary embodiment will be described focusing on differences from the first exemplary embodiment. In the present exemplary embodiment, processing to be executed when a maintenance event such as a lack of toner has occurred in a state where a job is received from the outside when an optional reproduction moving image is being displayed will be described.

FIGS. 9A to 9F are diagrams illustrating examples of screens displayed on the display device 115 according to the present exemplary embodiment. Hereinafter, a general overview of transition of display screens in the present exemplary embodiment will be described with reference to FIGS. 9A to 9F. The CPU 101 executes a program stored in the storage 111 to generate display data, so that the screens in FIGS. 9A to 9F are displayed on the display device 115 via the display control unit 114. In the example described below, it is assumed that a maintenance event of a lack of black toner occurs when the user provides a display instruction of a replacement operation of a toner container to cause a corresponding moving image to be displayed thereon.

Figure 9A:
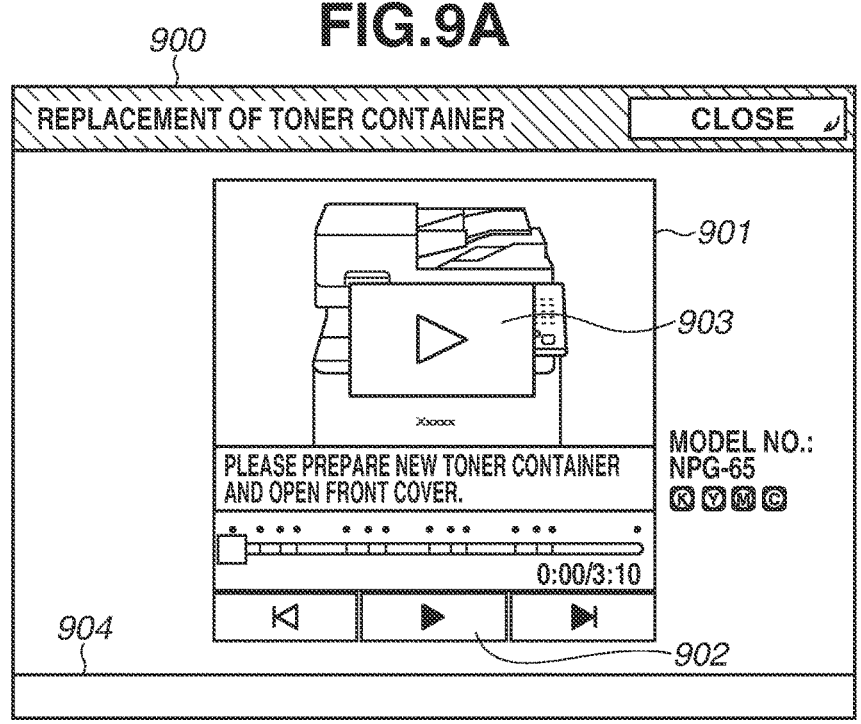
FIGS. 9A, 9B, 9C, 9D, 9E, and 9F are diagrams illustrating examples of screens displayed on the display device 115 according to a second exemplary embodiment.

FIG. 9A is a diagram illustrating an example of a maintenance screen firstly displayed when the menu 701

"REPLACEMENT OF TONER CONTAINER" is selected at the confirmation screen 700 of the maintenance method illustrated in FIG. 7A. According to the moving image list table 400, when "REPLACEMENT OF TONER CONTAINER" is selected (i.e., when the maintenance ID is "016"), partial moving images having the moving image IDs B1, B2, B3, B4, B5, B6, B7, B8, B9, and B10 are reproduced sequentially. In FIG. 9A, a maintenance screen 900 in which the partial moving image B1 as a prior preparation moving image is stopped at the beginning is displayed. A moving image display region 901 for displaying an optional reproduction moving image, a reproduction button 902, a reproduction mark 903, and a status display region 904 are displayed on the maintenance screen 900. However, as illustrated in FIG. 9A, in a state where a maintenance event does not occur, a message corresponding to the maintenance event is not displayed on the status display region 904.

Figure 9B:
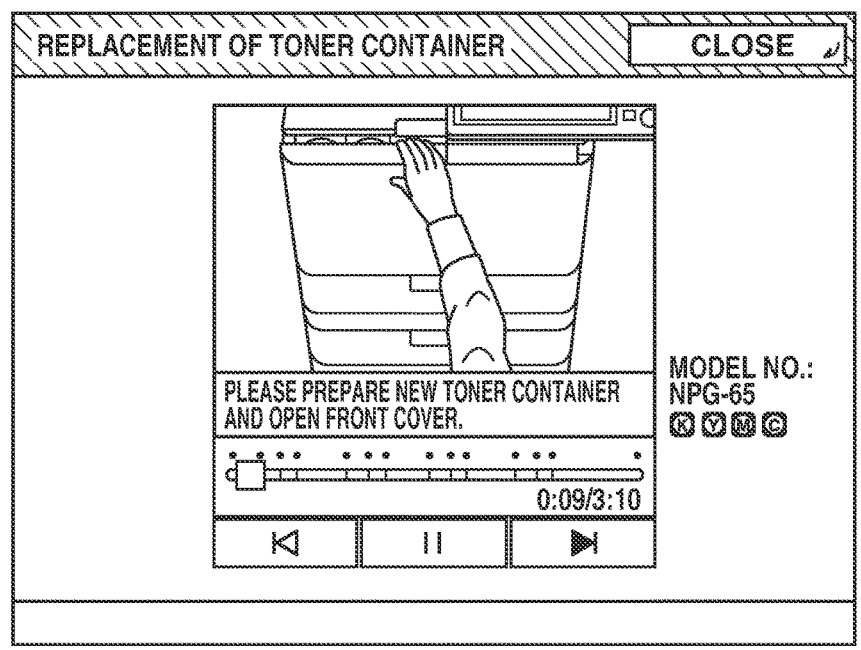

When the reproduction button 902 or the reproduction mark 903 is pressed at the screen in FIG. 9A, reproduction of the optional reproduction moving image is started. When the maintenance ID is "016", the CPU 101 starts reproducing the partial moving image B1 as a prior preparation moving image. FIG. 9B illustrates an example of a screen after 9 seconds from a start of reproduction of the partial moving image B1.

Figure 9C:
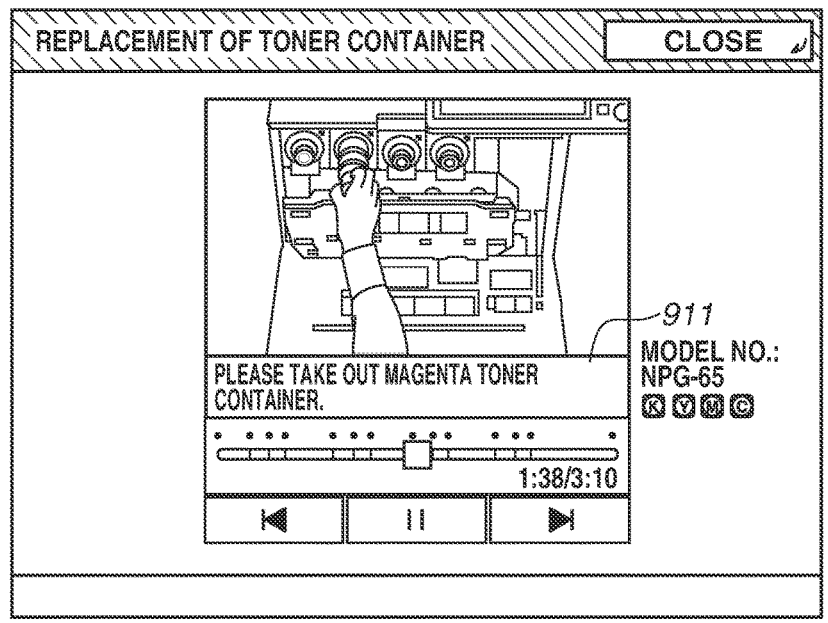

FIG. 9C is a diagram illustrating an example of a screen after 8 seconds from a start of reproduction of the partial moving image B6. In the screen in FIG. 9C, a message corresponding to the partial moving image B6, "PLEASE TAKE OUT MAGENTA TONER CONTAINER." is displayed in the message region 911.

Figure 9D:
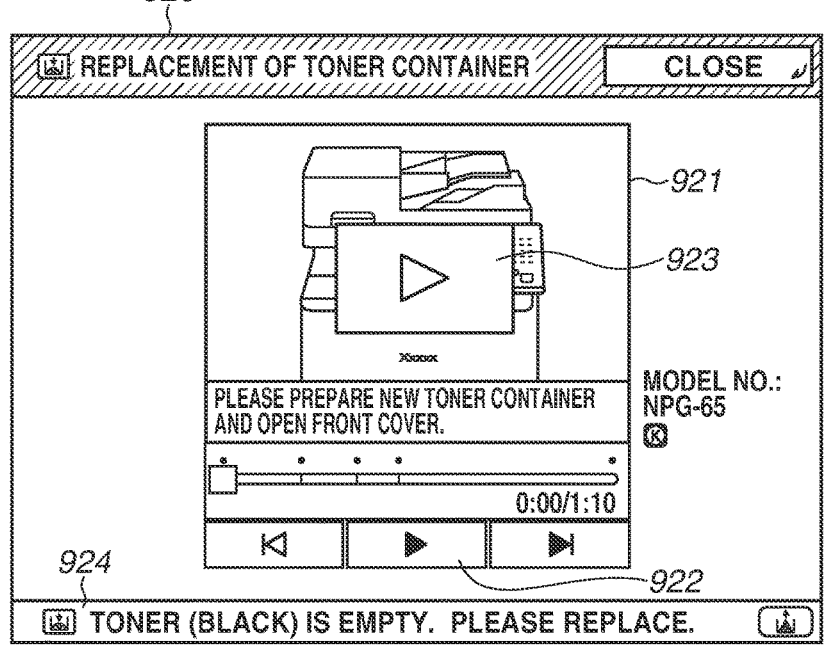

FIG. 9D is a diagram illustrating an example of a maintenance screen displayed in a case where occurrence of a lack of black toner is detected when the partial moving image B6 is being reproduced. When occurrence of the maintenance event is detected, display of the optional reproduction moving image is ended automatically, and a maintenance screen 920 in which the partial moving image B1 as a first part of the event occurrence moving image is stopped at the beginning is preferentially displayed on the display device 115. A moving image display region 921 for displaying the event occurrence moving image, a reproduction button 922, a reproduction mark 923, and a status display region 924 are displayed on the maintenance screen 920. In FIG. 9D, a message corresponding to a lack of black toner, i.e., "TONER (BLACK) IS EMPTY. PLEASE REPLACE." is displayed in the status display region 924.

Figure 9E:
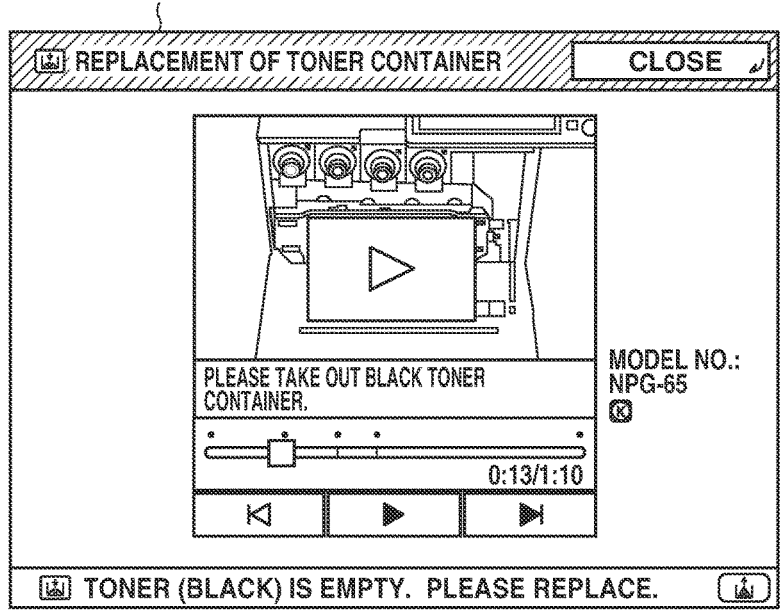

FIG. 9E is a diagram illustrating an example of a maintenance screen displayed in a case where opening of the front cover 202 is detected when the event occurrence moving image is being reproduced. When opening of the front cover 202 is detected, a maintenance screen 930 in which the partial moving image B2 as a first part of the main content moving image is stopped at the beginning is displayed.

Figure 9F:
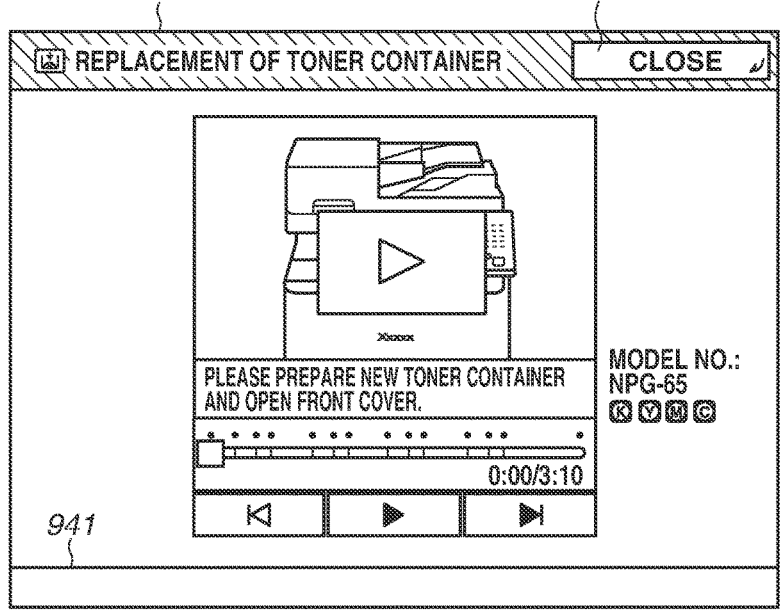

FIG. 9F is a diagram illustrating an example of a screen displayed in a case where solution of a lack of black toner is detected after the user has replaced the black toner container. When solution of the maintenance event is detected, the optional reproduction moving image displayed before the display is switched to the event occurrence moving image is displayed again. As illustrated in FIG. 9F, because the maintenance event is solved, a message corresponding to the maintenance event is not displayed on the status display region 941.

At this time, a maintenance screen 940 in which the partial moving image B1 as a first partial moving image is stopped at the beginning is displayed. In other words, as illustrated in FIG. 9C, even if the optional reproduction moving image is being reproduced halfway before the display is switched to the event occurrence moving image, the moving image is reproduced from the beginning when the optional reproduction moving image is displayed again. In addition, the maintenance screen 940 is hidden when a close button 942 is pressed.

Figure 10B:
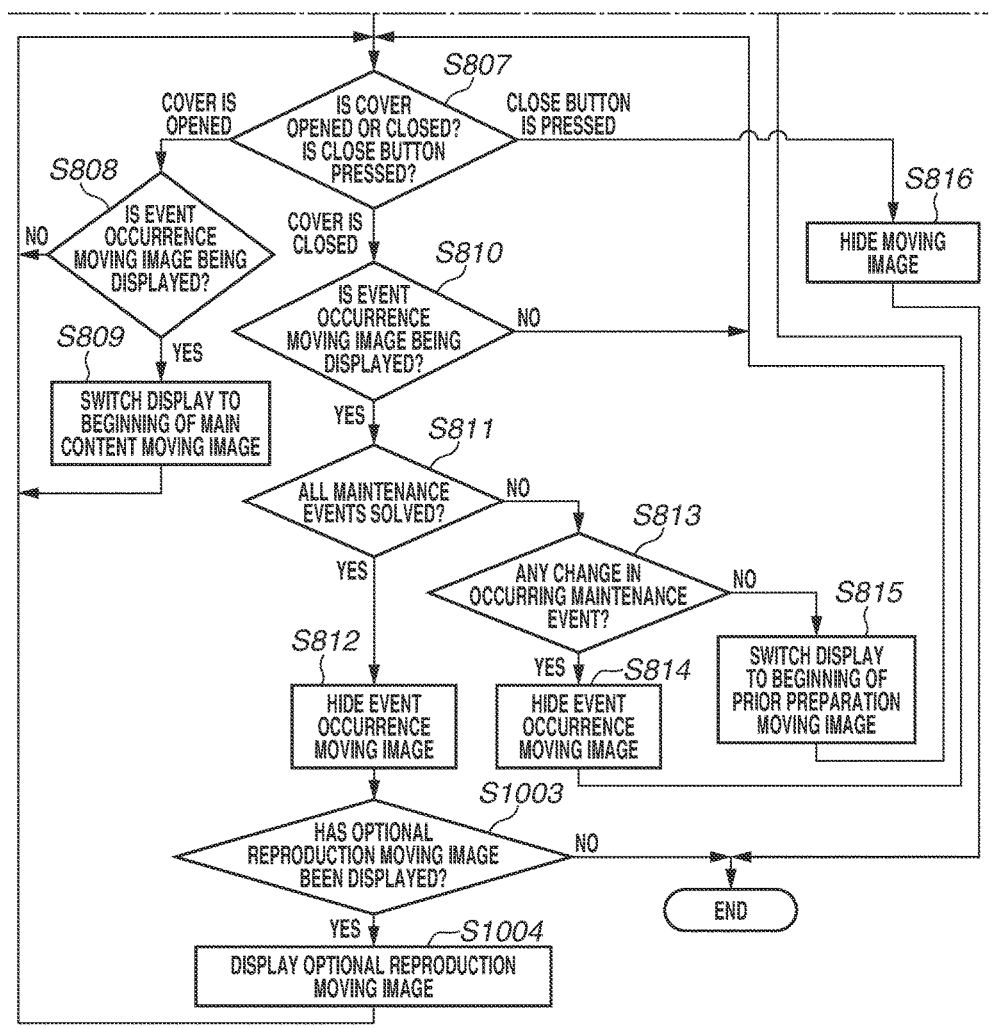
FIG. 10 (which includes FIGS. 10A and 10B) is a flowchart illustrating display processing of a moving image illustrating a maintenance method according to the second exemplary embodiment.

Next, display processing of the moving image illustrating a maintenance method according to the present exemplary embodiment will be described with reference to FIGS. 10A and 10B. The CPU 101 implements respective steps of the flowchart illustrated in FIGS. 10A and 10B by executing a program stored in the storage 111. The same step numbers are applied to processing steps similar to the processing steps in FIG. 8 described in the first exemplary embodiment, and description thereof will be omitted. In FIGS. 10A and 10B, processing steps S1001 to S1004 are newly added.

In step S801, if occurrence of the maintenance event is detected (YES in step S801), the processing proceeds to step S1001. In step S1001, the CPU 101 determines whether the optional reproduction moving image is being displayed. More specifically, the CPU 101 determines whether the display flag of the optional reproduction moving image is set to ON. If the optional reproduction moving image is being displayed (YES in step S1001), the processing proceeds to step S1002. In step S1002, the CPU 101 hides the optional reproduction moving image and sets the display flag of the optional reproduction moving image to OFF, and the processing proceeds to step S802 and subsequent steps. In this way, display processing of the event occurrence moving image illustrating a series of operation contents required to solve the occurring maintenance event is executed. In addition, when the optional reproduction moving image is hidden in step S1002, information indicating that the optional reproduction moving image has been displayed is stored in the RAM 104.

After the CPU 101 determines that the maintenance event is solved in step S811 and hides the event occurrence moving image in step S812, in step S1003, the CPU 101 determines whether the optional reproduction moving image has been displayed immediately before the event occurrence moving image is displayed. Herein, determination is made based on the information stored in the RAM 104 in step S1002. If the optional reproduction moving image has been displayed (YES in step S1003), the processing proceeds to step S1004. In step S1004, the CPU 101 displays the optional reproduction moving image again. After displaying the optional reproduction moving image again, the CPU 101 returns the processing to step S807.

As described above, according to the present exemplary embodiment, in a case where a job is received from the outside, and a maintenance event has occurred in a state where the optional reproduction moving image is being displayed on the display device 115, the event occurrence moving image is displayed in preference to the optional reproduction moving image. With this configuration, the user can notice occurrence of the maintenance event, so that a state of the image forming apparatus can be restored promptly.

Next, a third exemplary embodiment will be described focusing on differences from the second exemplary embodiment. In the processing described in the second exemplary embodiment, the event occurrence moving image is always displayed in preference to the optional reproduction moving image in a case where the job is received from the outside and a maintenance event has occurred in a state where the optional reproduction moving image is being displayed. However, even if the maintenance event occurs, there is a case where the user would like to continuously reproduce the optional reproduction moving image reproduced halfway. For example, this applies to a case where the maintenance event such as a paper jam occurs when the optional reproduction moving image illustrating the operation content of replacing a toner container is being reproduced. In the present exemplary embodiment, a method of solving the above will be described.

FIGS. 11A to 11D are diagrams illustrating examples of screens displayed on the display device 115 according to the present exemplary embodiment. Hereinafter, a general overview of transition of display screens in the present exemplary embodiment will be described with reference to FIGS. 11A to 11D. The CPU 101 executes a program stored in the storage 111 to generate display data, so that the screens in FIGS. 11A to 11D are displayed on the display device 115 via the display control unit 114. In the example described below, it is assumed that a maintenance event of a paper jam at the two-sided conveyance portion (the maintenance ID is "018") occurs after the user has provided a display instruction of a replacement operation of a toner container.

Figure 11A:
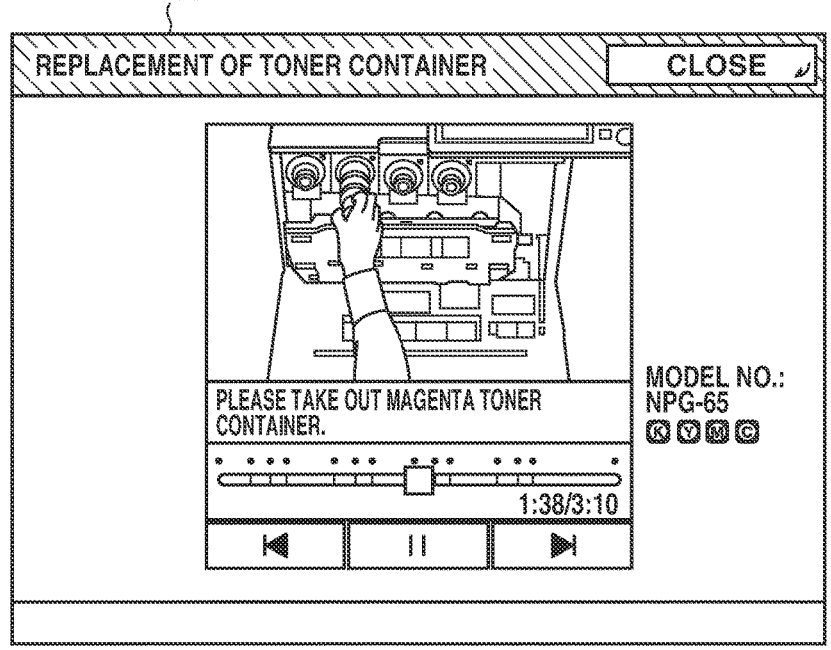
FIGS. 11A, 11B, 11C, and 11D are diagrams illustrating examples of screens displayed on the display device 115 according to a third exemplary embodiment.

FIG. 11A is a diagram illustrating an example of a maintenance screen after 8 seconds from a start of reproduction of the partial moving image B6, when the menu 701 "REPLACEMENT OF TONER CONTAINER" is selected from the confirmation screen 700 of the maintenance method illustrated in FIG. 7A.

Figure 11B:
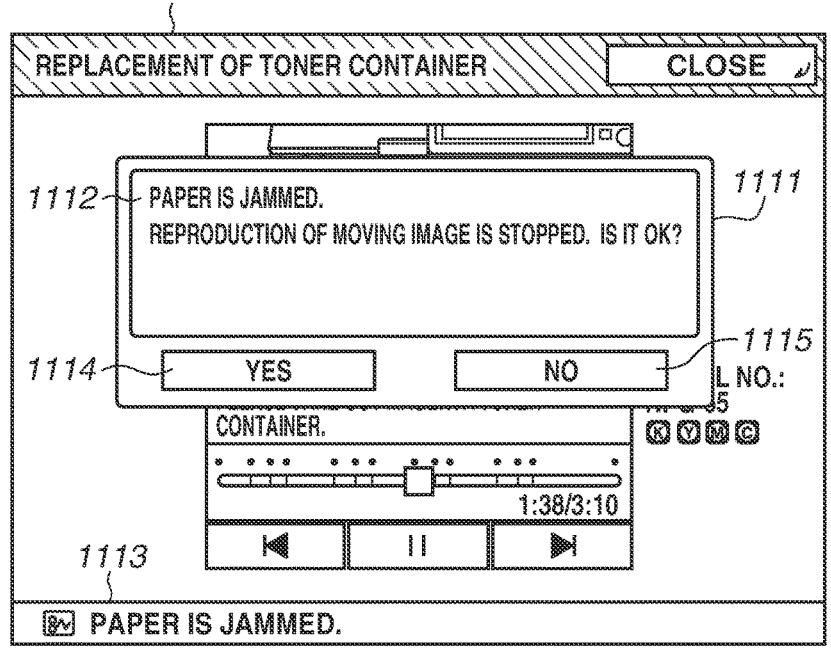
Figure 11C:
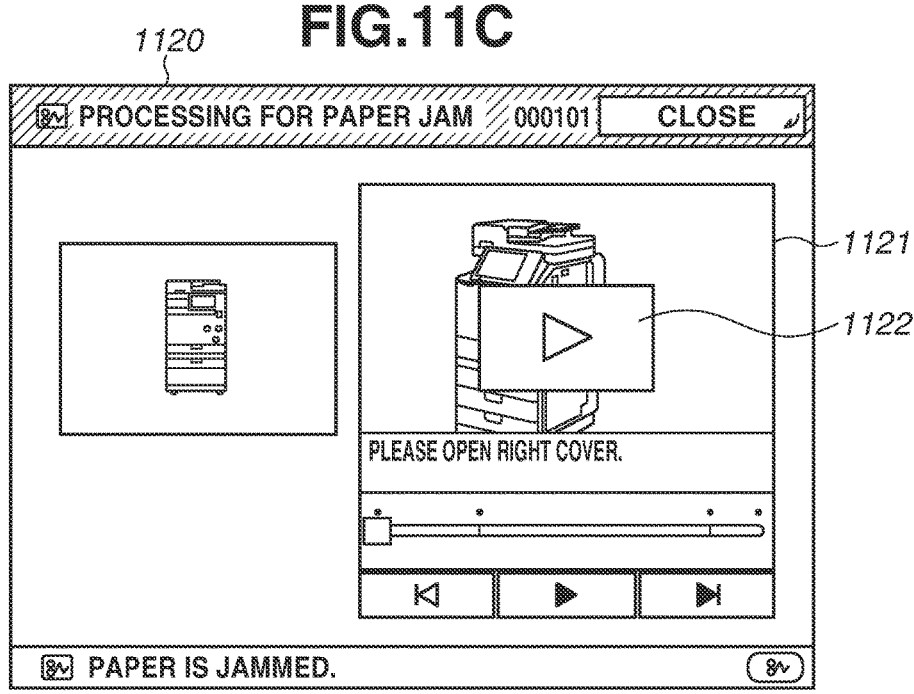

FIG. 11B is a diagram illustrating an example of a maintenance screen displayed in a case where occurrence of a paper jam at the two-sided conveyance portion is detected when the partial moving image B6 is being reproduced. In a case where occurrence of the maintenance event is detected in a state where the optional reproduction moving image is being reproduced, reproduction of the partial moving image is automatically stopped tentatively, and a stop confirmation dialogue 1111 which prompts a user to select whether to stop reproducing the moving image is displayed. A stop confirmation message region 1112, a YES button 1114, and a NO button 1115 are displayed on the stop confirmation dialogue 1111. In FIG. 11B, a message corresponding to a paper jam, i.e., "PAPER IS JAMMED." is displayed in the status display region 1113.

When the YES button 1114 is pressed at the stop confirmation dialogue 1111, a maintenance screen 1120 in which the partial moving image C1 as a first part of the event occurrence moving image is stopped at the beginning is preferentially displayed on the display device 115. A moving image display region 1121 for displaying the event occurrence moving image and a reproduction mark 1122 are displayed on the maintenance screen 1120 illustrated in FIG. 11C.

Figure 11D:
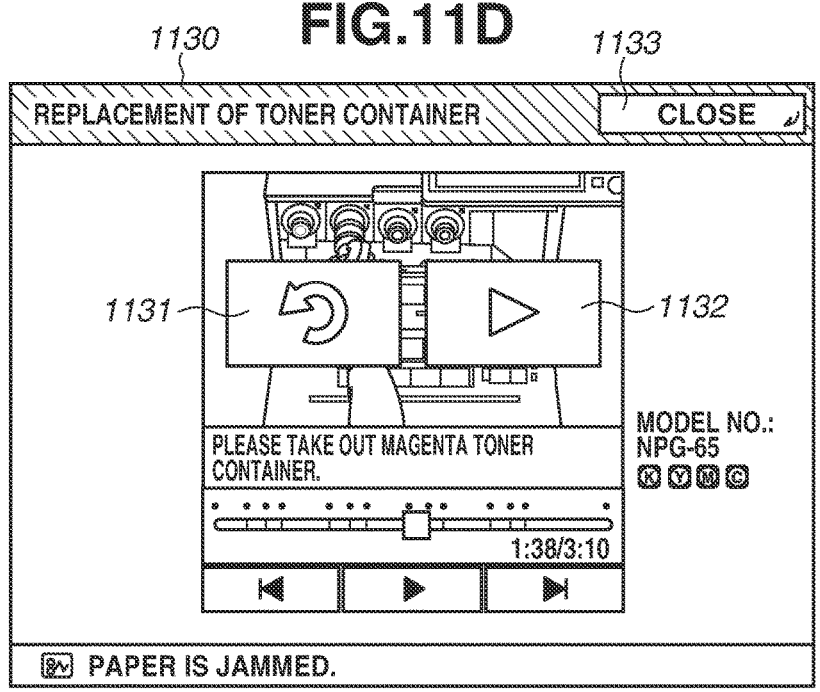

When the NO button 1115 is pressed at the stop confirmation dialogue 1111, a reproduction mark 1132 is displayed on a maintenance screen 1130 illustrated in FIG. 11D together with a replay mark 1131. With this configuration, the partial moving image B6 that is being reproduced halfway can be reproduced continuously.

Figure 12:
FIG. 12 is a flowchart (which includes FIGS. 12A and 12B) illustrating display processing of a moving image illustrating a maintenance method according to the third exemplary embodiment.
Figure 12A:
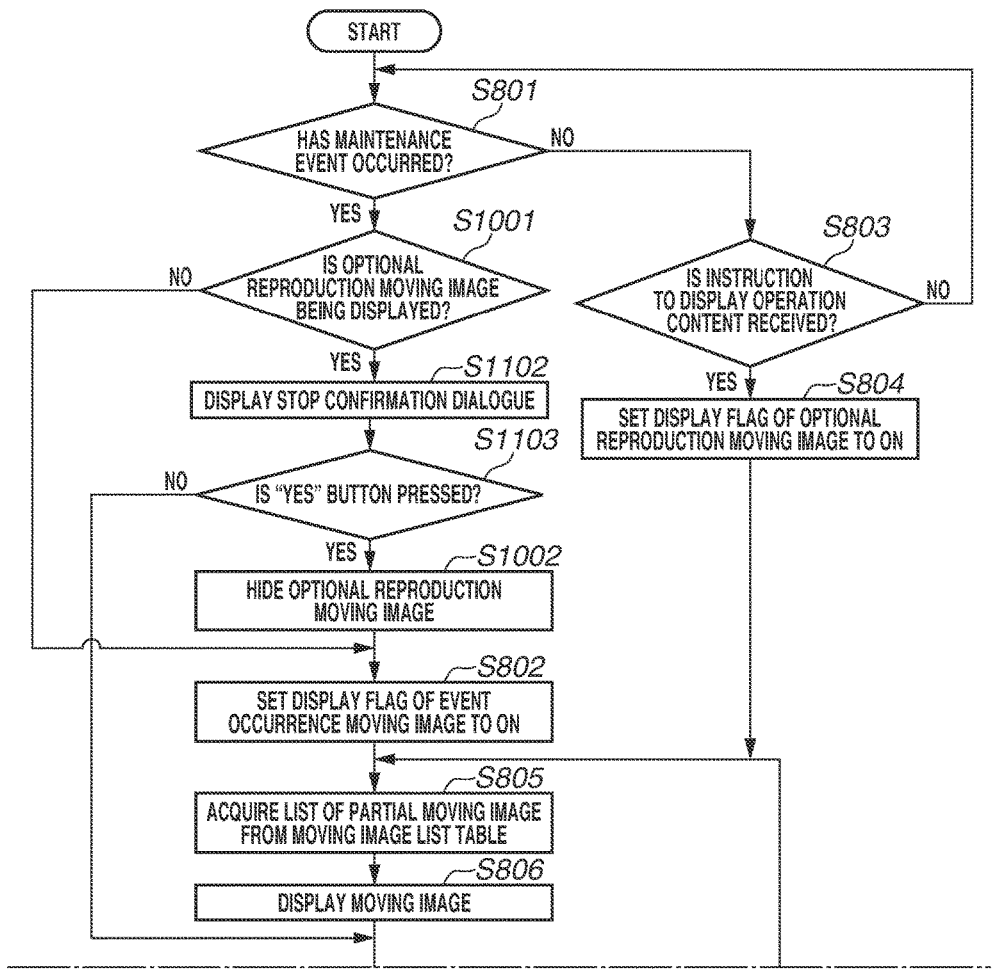
Figure 12B:
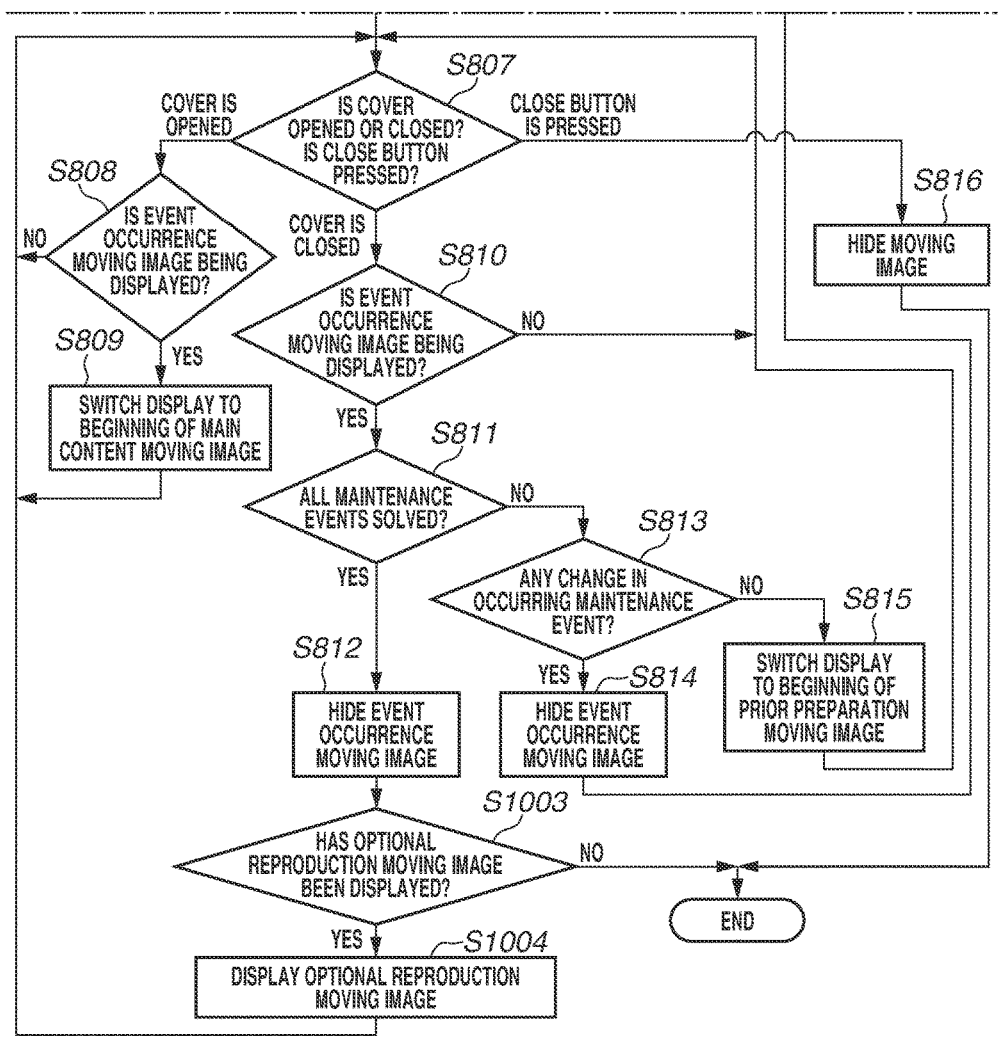

Next, display processing of the moving image illustrating a maintenance method according to the present exemplary embodiment will be described with reference to FIGS. 12A and 12B. The CPU 101 implements respective steps of the flowchart illustrated in FIGS. 12A and 12B by executing a program stored in the storage 111. The same step numbers are applied to processing steps similar to the processing steps of FIGS. 10A and 10B described in the second exemplary embodiment, and description thereof will be omitted. FIG. 12A is different from FIG. 10A in that processing steps S1102 and S1103 are added.

After the CPU 101 detects occurrence of the maintenance event in step S801 and determines that the optional reproduction moving image is being displayed in step S1001, in step S1102, the CPU 101 displays the stop confirmation dialogue 1111 as illustrated in FIG. 11B.

Next, in step S1103, the CPU 101 determines whether an instruction for stopping display of the optional reproduction moving image is received. More specifically, the CPU 101 determines whether a button pressed at the stop confirmation dialogue 1111 is the YES button 1114 or the NO button 1115.

In step S1103, if the CPU 101 determines that the YES button 1114 is pressed (YES in step S1103), the processing proceeds to step S1002 and subsequent steps. Then, the CPU 101 hides the optional reproduction moving image and switches the display to the event occurrence moving image. If the NO button 1115 is pressed in step S1103 (NO in step S1103), the processing proceeds to step S807, and the CPU 101 continuously displays the optional reproduction moving image without switching the display to the event occurrence moving image.

As described above, according to the present exemplary embodiment, in a case where a job is received from the outside and a maintenance event occurs in a state where the optional reproduction moving image is being reproduced, a confirmation screen which prompts a user to select whether to stop displaying the optional reproduction moving image is displayed. With this configuration, the user can continuously reproduce the optional reproduction moving image reproduced halfway, usability of the image forming apparatus can be improved.

Next, a fourth exemplary embodiment will be described focusing on differences from the first to the third exemplary embodiments. In the first to the third exemplary embodiments, when the optional reproduction moving image is being displayed, even if opening or closing of the cover corresponding to the maintenance ID is detected in step S807 (COVER IS OPENED (CLOSED) in step S807), the optional reproduction moving image is displayed continuously according to the processing in step S808 or S810 (NO in step S808 or S810). In a case where a job is input by another user on the outside when the optional reproduction moving image is being displayed and the maintenance method is being described to the user, there is a possibility that execution of the job input from the outside may be interfered if the user performs the operation such as opening a cover illustrated in the prior preparation moving image. In the present exemplary embodiment, a method of solving the above problem will be described.

FIGS. 13A to 13D are diagrams illustrating examples of screens displayed on the display device 115 according to the present exemplary embodiment. Hereinafter, a general overview of transition of display screens in the present exemplary embodiment will be described with reference to FIGS. 13A to 13D. The CPU 101 executes a program stored in the storage 111 to generate display data, so that the screens in FIGS. 13A to 13D are displayed on the display device 115 via the display control unit 114. In the example described below, it is assumed that opening of the front cover 202 is detected after the user has provided a display instruction of a replacement operation of a toner container.

Figure 13A:
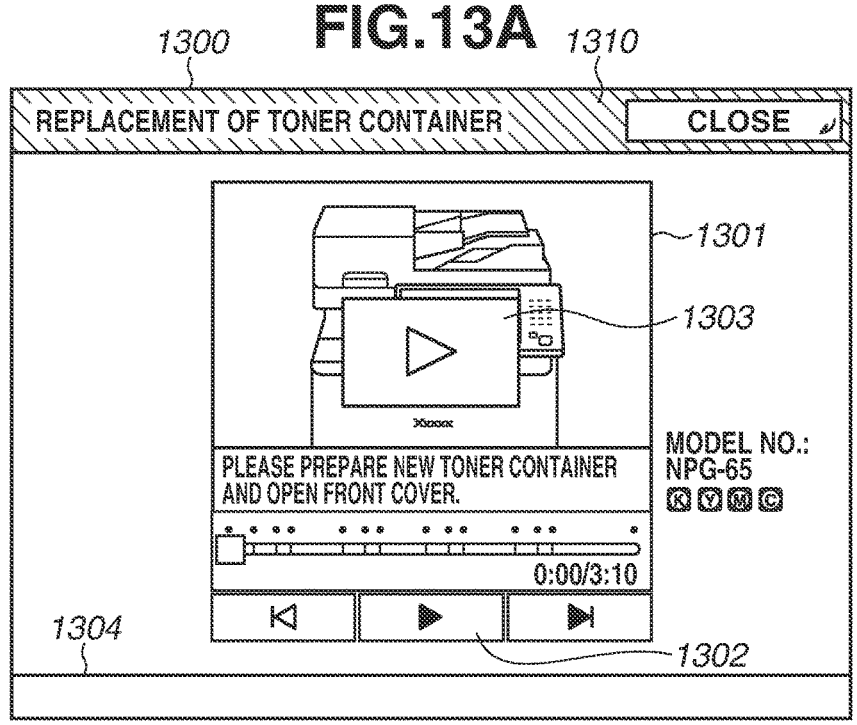

FIG. 13A is a diagram illustrating an example of a maintenance screen firstly displayed when the menu 701 "REPLACEMENT OF TONER CONTAINER" is selected at the confirmation screen 700 of the maintenance method illustrated in FIG. 7A. According to the moving image list table 400, when "REPLACEMENT OF TONER CONTAINER" is selected (i.e., when the maintenance ID is "016"), partial moving images having the moving image IDs B1, B2, B3, B4, B5, B6, B7, B8, B9, and B10 are reproduced sequentially. In FIG. 13A, a maintenance screen 1300 in which the partial moving image B1 as a prior preparation moving image is stopped at the beginning is displayed. A moving image display region 1301 for displaying the optional reproduction moving image, a reproduction button 1302, a reproduction mark 1303, and a status display region 1304 are displayed on the maintenance screen 1300. However, as illustrated in FIG. 13A, in a state where a maintenance event does not occur, a message corresponding to the maintenance event is not displayed on the status display region 1304.

Figure 13B:
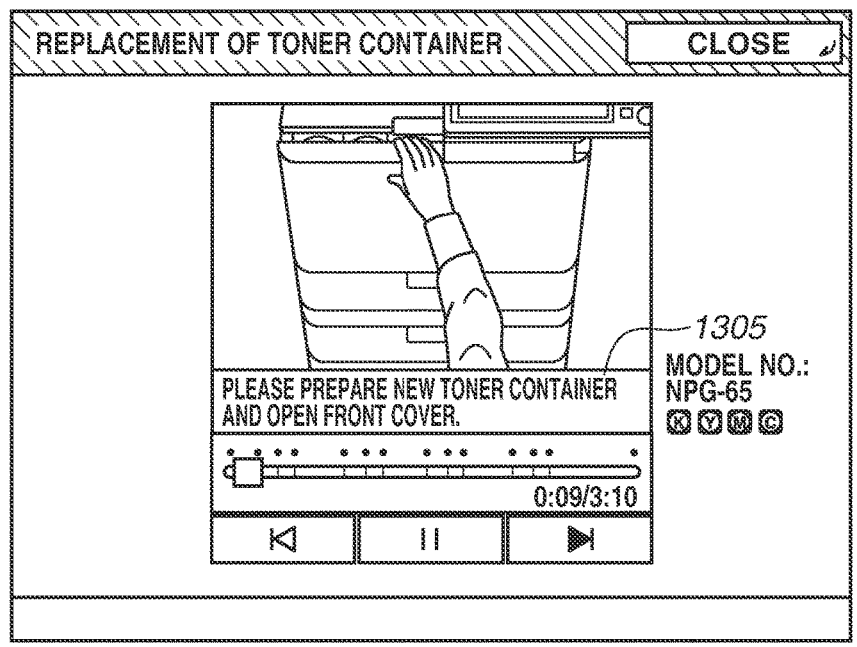

When the reproduction button 1302 or the reproduction mark 1303 is pressed at the screen in FIG. 13A, reproduction of the optional reproduction moving image is started. When the maintenance ID is "016", reproduction of the partial moving image B1 as a prior preparation moving image is started. FIG. 13B is a diagram illustrating an example of a maintenance screen after 9 seconds from a start of reproduction of the partial moving image B1. In the screen in FIG. 13B, a message corresponding to the partial moving image B1, "PLEASE PREPARE NEW TONER CONTAINER AND OPEN FRONT COVER." is displayed in the message region 1305.

FIG. 13C is a diagram illustrating an example of a screen displayed in a case where opening of the front cover 202 is detected when the partial moving image B1 is being reproduced. When opening of the front cover 202 is detected, reproduction of the partial moving image B1 is ended automatically, and a cover closing screen 1320 for prompting the user to close the front cover 202 is preferentially displayed on the display device 115. A cover closing message region 1321 and a status display region 1322 are displayed on the cover closing screen 1320. In FIG. 13C, a message "PLEASE CLOSE FRONT COVER." is displayed in the cover closing message region 1321, and a message "COVER IS OPENED." is displayed in the status display region 1322. The maintenance screen 1300 and the cover closing screen 1320 are different in that a title display region 1310 of the maintenance screen 1300 is expressed in gray that is a color less effective in drawing attention, whereas a title display region 1323 of the cover closing screen 1320 is expressed in orange that is a color highly effective in drawing attention.

FIG. 13D is a diagram illustrating an example of a maintenance screen displayed in a case where closing of the front cover 202 is detected when the screen in FIG. 13C is being displayed. When closing of the front cover 202 is detected, the optional reproduction moving image displayed before the cover closing screen 1320 is displayed is displayed. In this case, a maintenance screen 1330 in which the partial moving image B1 as a first part of the optional reproduction moving image corresponding to replacement of a toner container is stopped at the beginning is displayed. As illustrated in FIG. 13D, because opening of the cover is solved, a message "COVER IS OPENED." is not displayed in a status display region 1331. Herein, the maintenance screen 1330 is hidden when the close button 1332 is pressed.

Figure 14:
FIG. 14 is a flowchart (which includes FIGS. 14A and 14B) illustrating display processing of a moving image illustrating a maintenance method according to the fourth exemplary embodiment.
Figure 14A:
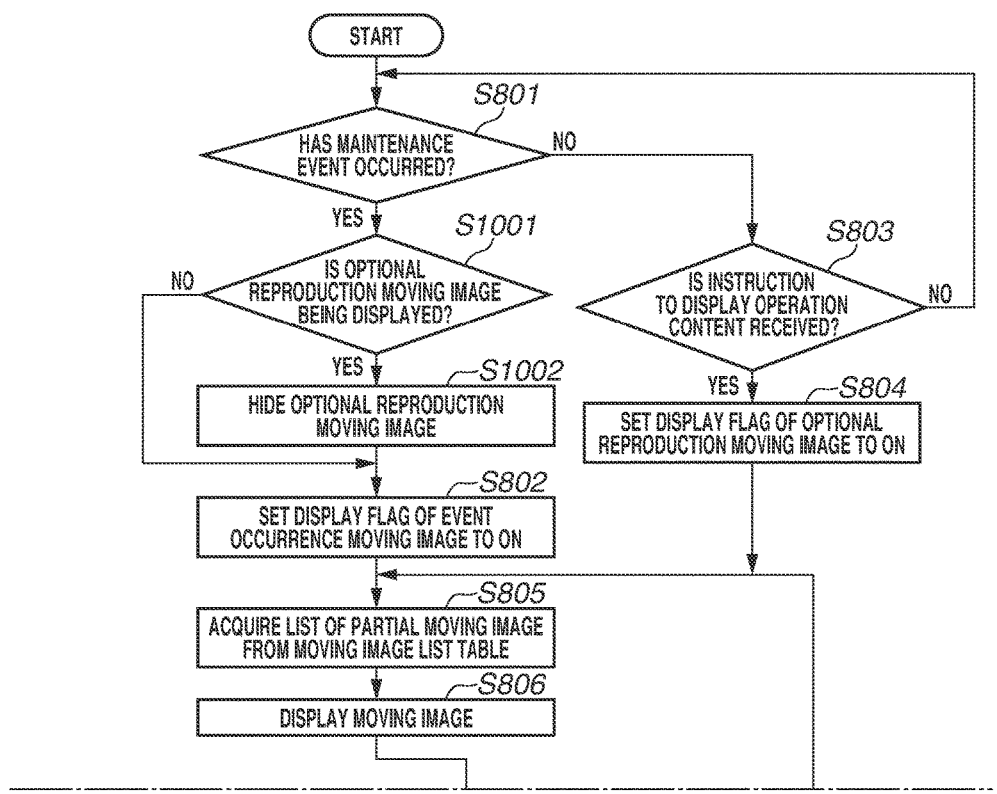
Figure 14B:
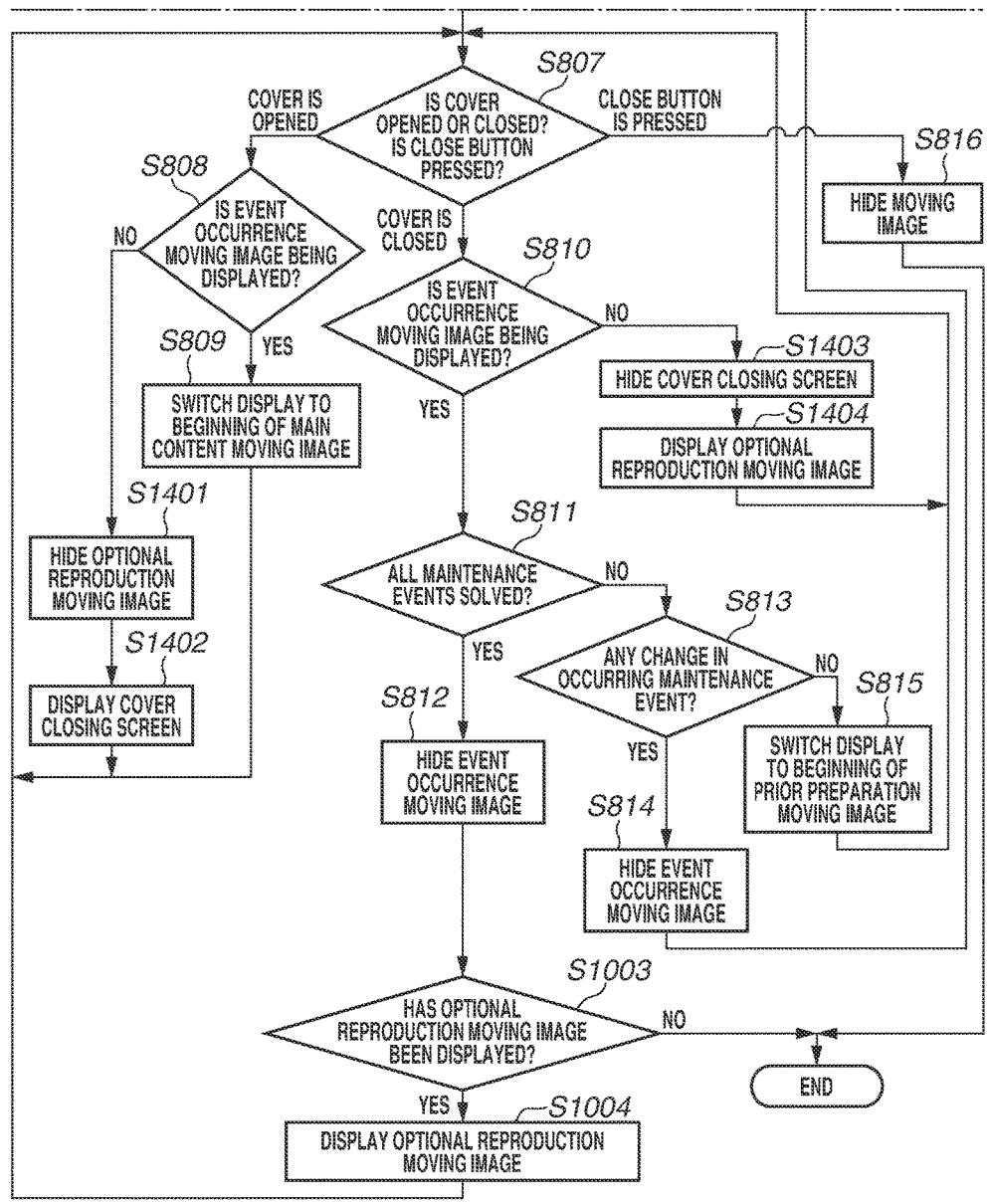

Next, display processing of a series of operation contents required to solve the maintenance event according to the present exemplary embodiment will be described with reference to FIGS. 14A and 14B. The CPU 101 executes a program stored in the storage 111, so as to execute respective steps illustrated in the flowchart in FIGS. 14A and 14B. Herein, processing different from the processing in the flowchart of FIGS. 10A and 10B described in the second exemplary embodiment will be mainly described. The same step numbers are applied to processing steps similar to the processing steps in FIGS. 10A and 10B, and description thereof will be omitted. In FIG. 14B, processing steps S1401 to S1404 are newly added. In addition, processing steps S1401 to S1404 may be added to the processing in FIG. 8 or 12B instead of the processing in FIG. 10B.

In a case where the CPU 101 determines that the cover corresponding to the currently displayed moving image is opened in step S807 and determines that the optional reproduction moving image is being displayed in step S808, in step S1401, the CPU 101 hides the optional reproduction moving image. At this time, because the optional reproduction moving image is hidden temporarily, the display flag of the optional reproduction moving image is not set to OFF. Then, in step S1402, the CPU 101 displays the cover closing screen 1320 and prompts the user to close the cover.

In a case where the CPU 101 determines that the cover is closed in step S807 and determines that the optional reproduction moving image is being displayed in step S810, in step S1403, the CPU 101 hides the cover closing screen 1320. Then, in step S1404, the CPU 101 displays the optional reproduction moving image displayed before displaying the cover closing screen 1320 again.

As described above, according to the present exemplary embodiment, when the user performs the operation of opening a cover illustrated in the prior preparation moving image of the optional reproduction moving image, the cover closing screen 1320 is displayed preferentially. With this configuration, the user can promptly solve a problem of interfering the execution of the job received from the outside.

Other Exemplary Embodiments

Although the exemplary embodiments have been described individually, the image forming apparatus may be provided with switches for inputting instructions for the respective operations described in the first to the fourth exemplary embodiments, so that the user can instruct the image forming apparatus to execute a certain operation through any one of the switches.

In the above-described exemplary embodiments, although the maintenance events such as a lack of toner, a full state of waste toner, and a paper jam have been described, a maintenance event other than the above, e.g., a lack of staples or the end of a drum lifetime may be also detected.

In the above-described exemplary embodiments, while the image forming apparatus including a plurality of functions, such as a copy function and a scanner function, has been described as an example, an image processing apparatus including only a part of the above functions is applicable. The above-described exemplary embodiments can be applied to another information processing apparatus, such as a personal computer, a personal digital assistance (PDA), a mobile phone, a facsimile, a camera, a video camera, or another image viewer.

According to the above-described exemplary embodiments, even if the maintenance event does not occur, the user can previously check a maintenance method corresponding to the maintenance event, and thus, improving usability of the image processing apparatus can be achieved.

Embodiment(s) can also be realized by a computer of a system or apparatus that reads out and executes computer executable instructions (e.g., one or more programs)

recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188414, filed Sep. 27, 2016, which is hereby incorporated by reference herein in its entirety.

What is claimed is:

1. An image processing apparatus comprising:
a detection unit configured to detect a maintenance event;
a reception unit configured to receive a display instruction to display a maintenance method corresponding to the maintenance event; and
a display control unit configured to display a first maintenance screen including a moving image indicating the maintenance method based on the detection of the maintenance event and display a second maintenance screen including the moving image indicating the maintenance method based on receipt of the display instruction in a state where the maintenance event is not detected,
wherein, in a case where the maintenance event is detected while the second maintenance screen is being displayed, the display control unit switches a display from the second maintenance screen to the first maintenance screen.

2. The image processing apparatus according to claim 1, wherein the display control unit performs control so that the first maintenance screen and the second maintenance screen are expressed in different display modes.

3. The image processing apparatus according to claim 1, wherein the display control unit performs control so that a color of a predetermined region in the first maintenance screen and a color of a predetermined region in the second maintenance screen are expressed in different colors.

4. The image processing apparatus according to claim 3, wherein the predetermined regions are regions for displaying a title of the maintenance method.

5. The image processing apparatus according to claim 1, wherein, when the maintenance event is solved after the display is switched from the second maintenance screen to the first maintenance screen, the display control unit switches the display from the first maintenance screen to the second maintenance screen.

6. The image processing apparatus according to claim 1, wherein, in a case where the maintenance event is detected while the second maintenance screen is being displayed, the display control unit displays a screen prompting a user to select whether to switch a display to the first maintenance screen or to continuously display the second maintenance screen.

7. The image processing apparatus according to claim 1,
wherein the display control unit displays a selection screen for selecting a maintenance method to be displayed from among a plurality of types of maintenance methods, and
wherein the reception unit receives the display instruction to display a maintenance method from a user via the selection screen.

8. The image processing apparatus according to claim 1, further comprising a storage unit configured to store a plurality of moving images respectively indicating a plurality of operations to be executed by a user,
wherein a moving image indicating the maintenance method is configured of a plurality of moving images stored in the storage unit.

9. The image processing apparatus according to claim 1 further comprising a printing unit configured to print an image on a sheet based on image data.

10. The image processing apparatus according to claim 1,
wherein a detected maintenance event includes a lack of toner, and
wherein a maintenance method corresponding to the lack of toner is a method of replacing a toner container.

11. The image processing apparatus according to claim 1,
wherein a detected maintenance event includes a sheet jam, and
wherein a maintenance method corresponding to the sheet jam is a method of removing a jammed sheet.

12. A control method of an image processing apparatus, the method comprising:
detecting a maintenance event;
receiving a display instruction to display a maintenance method corresponding to the maintenance event; and
displaying a first maintenance screen including a moving image indicating the maintenance method based on detection of the maintenance event; and
displaying a second maintenance screen including the moving image indicating the maintenance method based on receipt of the display instruction to display the maintenance method in a state where the maintenance event is not detected,
switching display from the second maintenance screen to the first maintenance screen in a state where maintenance event is detected while the second maintenance screen is being displayed.

13. A non-transitory computer-readable storage medium storing a computer-readable program that causes a computer to execute a control method of an image processing apparatus, the control method comprising:
detecting a maintenance event;
receiving a display instruction to display a maintenance method corresponding to the maintenance event; and displaying a first maintenance screen including a moving image indicating the maintenance method based on detection of the maintenance event and displaying a second maintenance screen including the moving image indicating the maintenance method based on receipt of the display instruction to display the maintenance method in a state where the maintenance event is not detected, switching display from the second maintenance screen to the first maintenance screen in a state where maintenance event is detected while the second maintenance screen is being displayed.

\* \* \* \* \*